(12) United States Patent
Okura

(10) Patent No.: US 10,371,343 B2
(45) Date of Patent: Aug. 6, 2019

(54) VEHICULAR LAMP FITTING

(71) Applicant: ICHIKOH INDUSTRIES, LTD., Isehara-shi, Kanagawa-ken (JP)

(72) Inventor: Hisamitsu Okura, Isehara (JP)

(73) Assignee: ICHIKOH INDUSTRIES, LTD., Isehara-Shi (JP)

( * ) Notice: Subject to any disclaimer, the term of this patent is extended or adjusted under 35 U.S.C. 154(b) by 38 days.

(21) Appl. No.: 15/309,065

(22) PCT Filed: Apr. 10, 2015

(86) PCT No.: PCT/JP2015/061247
§ 371 (c)(1),
(2) Date: Nov. 4, 2016

(87) PCT Pub. No.: WO2015/170551
PCT Pub. Date: Nov. 12, 2015

(65) Prior Publication Data
US 2017/0067615 A1 Mar. 9, 2017

(30) Foreign Application Priority Data
May 7, 2014 (JP) .................... 2014-096113

(51) Int. Cl.
*F21V 11/00* (2015.01)
*F21S 43/40* (2018.01)
(Continued)

(52) U.S. Cl.
CPC ............... *F21S 43/40* (2018.01); *F21S 41/14* (2018.01); *F21S 41/24* (2018.01); *F21S 41/28* (2018.01);
(Continued)

(58) Field of Classification Search
CPC ........ F21S 48/24; F21S 43/237; F21S 43/247; F21S 43/251; F21S 41/24; B60Q 1/0011
(Continued)

(56) References Cited

U.S. PATENT DOCUMENTS 5,975,723 A 11/1999 Daumueller et al.
8,882,316 B2 * 11/2014 Natsume .............. B60Q 1/0052
362/511
(Continued)

FOREIGN PATENT DOCUMENTS

DE 10 2007 005 779 A1 8/2008
DE 10 2008 038 668 A1 2/2010
(Continued)

OTHER PUBLICATIONS

Office Action dated Aug. 27, 2018 in Chinese Patent Application No. 201580023247.8.

*Primary Examiner* — Matthew J. Peerce
(74) *Attorney, Agent, or Firm* — Foley & Lardner LLP

(57) ABSTRACT

A vehicular lamp fitting is provided with: a reflector having a first reflector portion; an inner panel; a first light guide member provided along an edge of the first reflector portion toward the center of the vehicle and disposed to be opposed to the first reflector portion; and a light source provided at least on either one end or the other end of the first light guide member so as to allow light to be incident on the first light guide member. The first light guide member is disposed so as to be visually recognized from the side of the vehicle, and part of direct light reflected by a reflective surface of the first light guide member and emitted toward the first reflector portion that has not been emitted ahead of the vehicle by the first reflector portion is emitted toward the side of the vehicle.

8 Claims, 19 Drawing Sheets

(51) Int. Cl.
*F21V 7/09* (2006.01)
*F21V 8/00* (2006.01)
*F21S 43/00* (2018.01)
*F21S 41/14* (2018.01)
*F21S 41/20* (2018.01)
*F21S 41/24* (2018.01)
*F21S 41/33* (2018.01)
*F21S 43/13* (2018.01)
*F21S 43/237* (2018.01)
*F21S 43/245* (2018.01)
*F21S 43/247* (2018.01)
*F21S 43/31* (2018.01)
*F21V 7/04* (2006.01)
*F21S 43/14* (2018.01)
*F21S 43/249* (2018.01)
*F21W 103/55* (2018.01)
*F21W 103/10* (2018.01)
*F21W 103/15* (2018.01)

(52) U.S. Cl.
CPC ............ *F21S 41/335* (2018.01); *F21S 43/00* (2018.01); *F21S 43/13* (2018.01); *F21S 43/14* (2018.01); *F21S 43/237* (2018.01); *F21S 43/245* (2018.01); *F21S 43/247* (2018.01); *F21S 43/249* (2018.01); *F21S 43/31* (2018.01); *F21V 7/04* (2013.01); *F21V 7/09* (2013.01); *G02B 6/0096* (2013.01); *F21W 2103/10* (2018.01); *F21W 2103/15* (2018.01); *F21W 2103/55* (2018.01)

(58) Field of Classification Search
USPC .......................................................... 362/509
See application file for complete search history.

(56) References Cited

U.S. PATENT DOCUMENTS

| | | | |
|---|---|---|---|
| 2003/0043593 A1 | 3/2003 | Amano | |
| 2003/0053318 A1 | 3/2003 | Amano | |
| 2004/0208016 A1* | 10/2004 | Kazaoka | ............... F21S 43/247 362/511 |
| 2012/0314448 A1 | 12/2012 | Nakada | |
| 2014/0362588 A1* | 12/2014 | Wu | ......................... F21V 13/04 362/327 |

FOREIGN PATENT DOCUMENTS

| | | |
|---|---|---|
| DE | 200810038668 A1 * | 2/2010 |
| EP | 2 490 052 A1 | 8/2012 |
| JP | 2013-048036 A | 3/2013 |
| JP | 2013-161729 A | 8/2013 |
| JP | 2013-191412 A | 9/2013 |
| JP | 2014-056769 A | 3/2014 |

* cited by examiner (a)

(b)

VEHICULAR LAMP FITTING

TECHNICAL FIELD

The present invention relates to a vehicular lamp fitting.

BACKGROUND ART

Conventionally, there have been proposed a variety of techniques of reflecting light from a light guide body by a reflector in a predetermined direction in a vehicular lamp fitting (for example, Patent Literature 1).

In Patent Literature 1, there is disclosed a vehicular lamp fitting which makes light from a light source to a light guide body and then emits the incident light from a rear face part of the light guide body to a rear side. In this vehicular lamp fitting, a reflector which is equipped with: a first reflection portion which is positioned at the rear side of the light guide body; and a second reflection portion which is adjacent to the first reflection portion, is provided, and the light that is emitted from the rear face part of the light guide body to the rear side is reflected to the second reflection portion by the first reflection portion and then the reflection light from the first reflection portion is reflected to a front side of the lamp fitting by the second reflection portion.

Incidentally, in recent years, there has been a demand for a further improvement of an appearance quality and functionality of a vehicle, and in a vehicular lamp fitting which is equipped with a light guide body and a reflector as well, there has been a demand for a further improvement of the appearance and visibility thereof.

However, in the vehicular lamp fitting that is disclosed in Patent Literature 1, when it is seen from the front side of the lamp fitting, the vicinity of the light guide body is brighter than any other part; and therefore, there is a problem that a difference in brightness is prone to arise and it is difficult to cope with the demand mentioned above.

CITATION LIST

Patent Literature

Patent Literature 1: Japanese Unexamined Patent Application Publication No. 2013-161729

SUMMARY OF THE INVENTION

Problems to be Solved by the Invention

The present invention has been made in view of such a circumstance, and it is an object of the present invention to provide a vehicular lamp fitting of which appearance is good, and moreover, of which visibility from a vehicular lateral side is more remarkably improved.

Means for Solving the Problem

The present invention is realized by the following configuration.

(1) A vehicular lamp fitting which is disposed at a vehicular front side, comprising: a reflector having a first reflector portion to reflect light to the vehicular front side; an inner panel to dispose the reflector; a first light guide member which is disposed along an edge part at a vehicular central side of the first reflector portion, and is disposed to oppose to the first reflector portion; and a light source which is provided at least at an end part of one end part and another end part of the first light guide member, and makes light incident into the first light guide member, wherein the first light guide member is disposed so as to be visually recognized from a vehicular lateral side, and of direct light which is reflected by a reflection surface of the first light guide member and then is emitted to the first reflector portion's side, light which has not been radiated to the vehicular front side by the first reflector portion is radiated to the vehicular lateral side.

(2) The vehicular lamp fitting according to the configuration of the above (1), in which the reflector has a second reflector portion which is provided so as to come into contact with the first reflector portion, the vehicular lamp fitting further comprising: a second light guide member which is provided along an end part of the second reflector portion, and is disposed to oppose to the second reflector portion; and a light source which is disposed at least an end part of one end part and another end part of the second light guide member, and makes light incident into the second light guide member, wherein the second light guide member has a reflection surface to reflect the light that is guided in the second light guide member, to the second reflector portion's side.

(3) The vehicular lamp fitting according to the configuration of the above (2), wherein, at a contact portion at which the first reflector portion and the second reflector portion come into contact with each other, a plurality of cutout parts are provided along the contact portion.

(4) The vehicular lamp fitting according to the configuration of the above (2), wherein the second reflector portion has a side hole of one end part for routing the one end part to a back face side of the second reflector portion, the one end part is disposed at the back face side of the second reflector portion through the side hole of the one end part, and the light source to make light incident into the second light guide member is disposed at the back face side of the second reflector portion so as to make light incident to the one end part.

(5) The vehicular lamp fitting according to the configuration of the above (2), wherein the one end is an end part at the vehicular front side of the second light guide member.

(6) The vehicular lamp fitting according to the configuration of the above (2), wherein the inner panel, when seen from the vehicular front side, has an edge part to cover the second light guide member so that the second light guide member is hardly visually recognized.

(7) The vehicular lamp fitting according to the configuration of the above (1), wherein the first reflector portion has a side hole of one end part for routing the one end part to a back face side of the first reflector portion, the one end part is disposed at the back face side of the first reflector portion through the side hole of the one end part, and the light source to make light incident into the first light guide member is disposed at the back face side of the first reflector part so as to make light incident to the one end part.

(8) The vehicular lamp fitting according to the configuration of the above (1), wherein the first reflector portion has a side hole of another end part for routing the another end part to the back face side of the first reflector portion, the another end part is disposed at the back face side of the first reflector portion through the side hole of the another end part, and the light source to make light incident into the first light guide member is disposed at the back face side of the first reflector portion so as to make light incident to the another end part.

(9) The vehicular lamp fitting according to the configuration of the above (1), wherein the one end part is an end part at the vehicular front side of the first light guide member, and the another end part is an end part at a vehicular rear side of the first light guide member.

(10) The vehicular lamp fitting according to the configuration of the above (1), wherein the inner panel, when seen from the vehicular front side, has an edge part to cover the first light guide member so that the first light guide member is hardly visually recognized.

(11) A vehicular lamp fitting which is disposed at a vehicular front side, comprising a reflector to reflect light to the vehicular front side, the reflector having a first reflector portion which is provided at a vehicular central side, wherein the first reflector portion is disposed to be oriented to a vehicular upper side, and is provided so as to be oriented to a lower side from a vehicular rear side towards the vehicular front side.

(12) The vehicular lamp fitting according to the configuration of the above (11), wherein the first reflector portion has a plurality of reflection surfaces to reflect light to the vehicular front side, and the plurality of the reflection surfaces each are formed in a stepwise manner from the vehicular front side towards the vehicular rear side.

(13) The vehicular lamp fitting according to the configuration of the above (11), wherein the reflector has a second reflector portion which is provided so as to come into contact with the first reflector portion at the vehicular central side, and at a contact portion at which the first reflector portion and the second reflector portion come into contact with each other, a plurality of cutout parts are provided along the contact portion.

(14) The vehicular lamp fitting according to the configuration of the above (13), wherein the contact portion approaches a vehicular inside from the vehicular rear side towards the vehicular front side.

(15) The vehicular lamp fitting according to the configuration of the above (13), wherein the second reflector portion has a plurality of reflection surfaces to reflect light to the vehicular front side, and the plurality of the reflection surfaces each are provided in a stepwise manner from the vehicular front side towards the vehicular rear side.

(16) The vehicular lamp fitting according to the configuration of the above (13), comprising a first light guide member which is provided along an end part at the vehicular central side of the first reflector portion and is disposed to oppose to the first reflector portion, wherein the first light guide member is disposed so as to be able to be visually recognized from a vehicular lateral side, and at least a part of direct light which has been emitted from the first light guide member is radiated to a vehicular lateral side through the cutout parts.

(17) A vehicular lamp fitting comprising: a light guide member; and a reflector which is provided along the light guide member, and reflects light from the light guide member; and a light source which is provided at a vehicular central side of the reflector, and makes light incident to an end part of the light guide member, wherein the reflector has a first reflection portion to reflect the light to a vehicular inside which is provided at the light source's side.

(18) The vehicular lamp fitting according to the configuration of the above (17), wherein the reflector has a second reflection portion which is provided at a side distant from the light source of the first reflection portion, and connects to the first reflection portion, and the second reflection portion reflects the light to a vehicular front side.

(19) The vehicular lamp fitting according to the configuration of the above (17), wherein the reflector has an opening at a position at the vehicular central side more significantly than the first reflection portion, the end part of the light guide member is disposed at a back face side of the reflector through the opening, and the light source is disposed at a back face side at the vehicular central side of the reflector so as to make light incident to the end part of the light guide member.

(20) The vehicular lamp fitting according to the configuration of the above (19), the first reflection portion is provided in contact with the opening.

Effect of the Invention

According to the present invention, it is possible to provide a vehicular lamp fitting of which appearance is good, and moreover, of which visibility from a vehicular lateral side is more remarkably improved.

BRIEF DESCRIPTION OF THE DRAWINGS

FIG. 10 (*b*) is a sectional view taken along the line H-H of FIG. 10 (*a*); FIG. 10 (*c*) is a sectional view taken along the line J-J; and FIG. 10 (*d*) is a sectional view taken along the line K-K of FIG. 10 (*c*).

MODE FOR CARRYING OUT THE INVENTION

Figure 1:
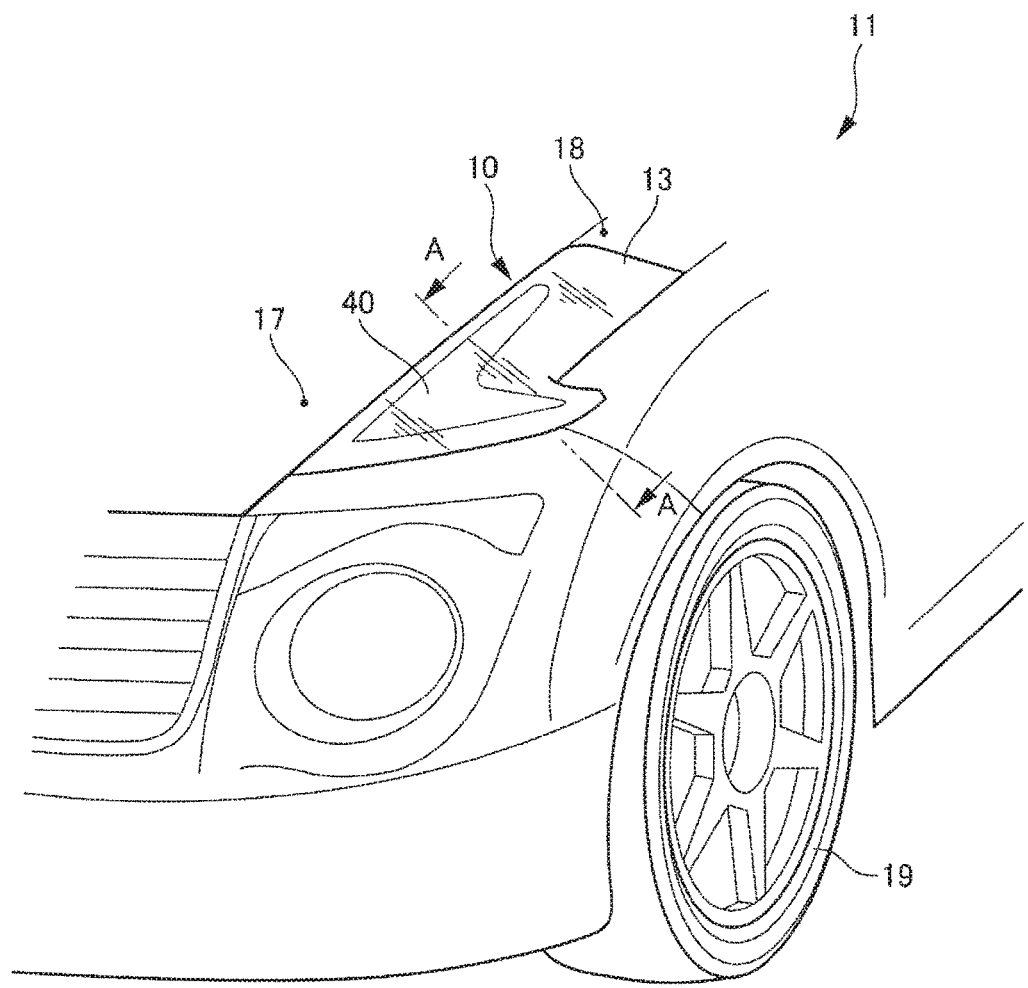
FIG. 1 is a perspective view of a vehicular front part which is equipped with a vehicular lamp fitting of a first embodiment according to the present invention.

Hereinafter, mode for carrying out the present invention (hereinafter, referred to as "embodiment(s)") will be described with reference to the accompanying drawings. Throughout the entire description of the embodiments, the same constituent elements are assigned by the same reference numerals. Also, in the embodiments and figures, the terms "forward" and "backward" respectively designate the "forward direction" and "backward direction" of a vehicle. In addition, in the embodiments, the terms "upper", "lower", "leftward", and "rightward" respectively designate the directions seen from a driver riding on the vehicle.

First Embodiment (Entire Configuration of Vehicular Lamp Fitting)

First, an entire configuration of a vehicular lamp fitting 10 will be described with reference to FIG. 1 to FIG. 4. As shown in FIG. 1, the vehicular lamp fitting 10 of the embodiment is a lamp fitting which is provided in a vehicle 11 and is disposed on the vehicular front side and on a top face of the vehicular lateral part. Incidentally, although, in the vehicle 11, a pair of left and right vehicular lamp fittings 10 are provided, the constituent elements of the left and right vehicular lamp fittings 10 are transversely symmetrical to each other; and therefore, only a vehicular lamp fitting 10 at the left side will be described.

Figure 2:
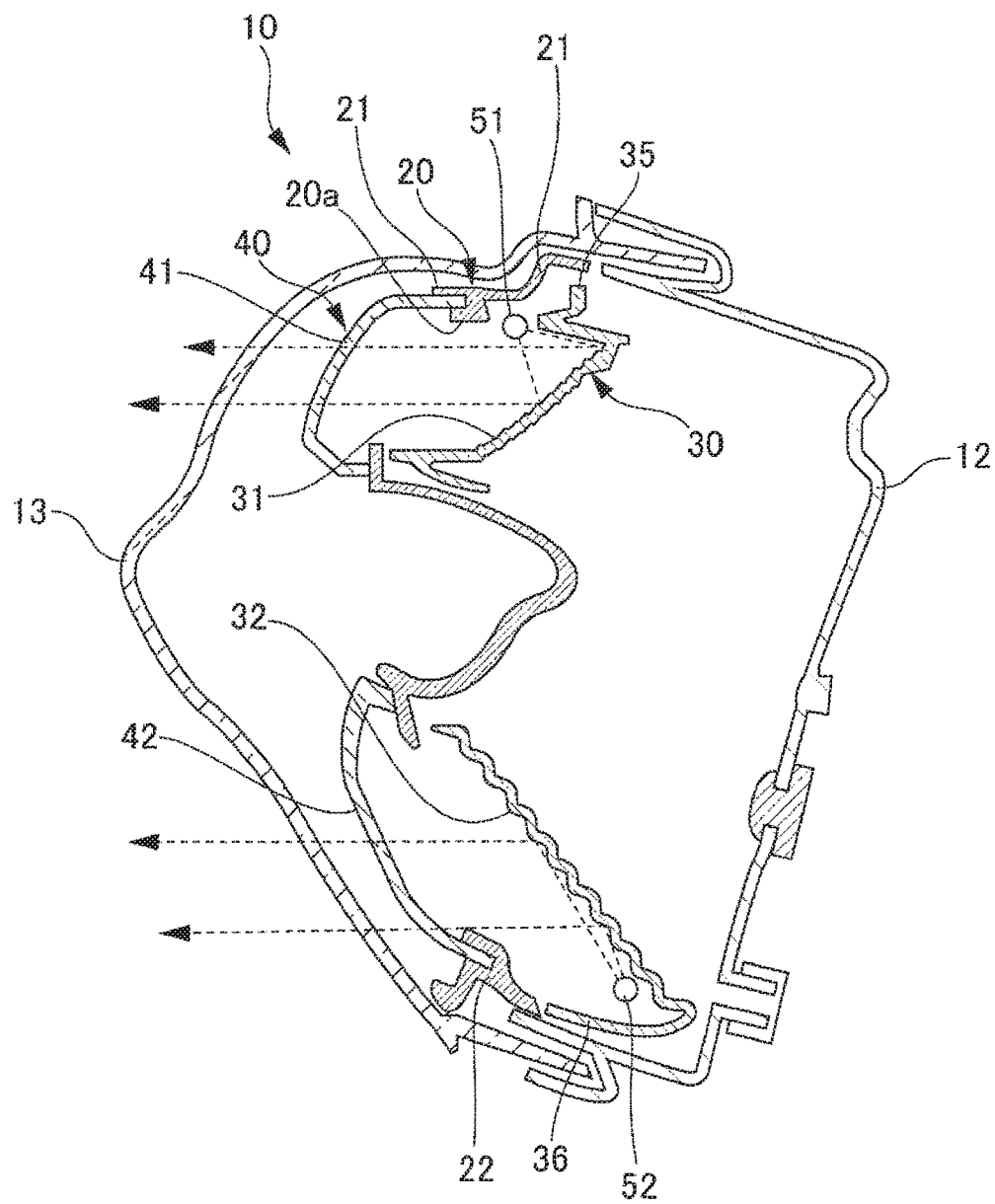
FIG. 2 is a sectional view taken along the line A-A of FIG. 1.
Figure 3:
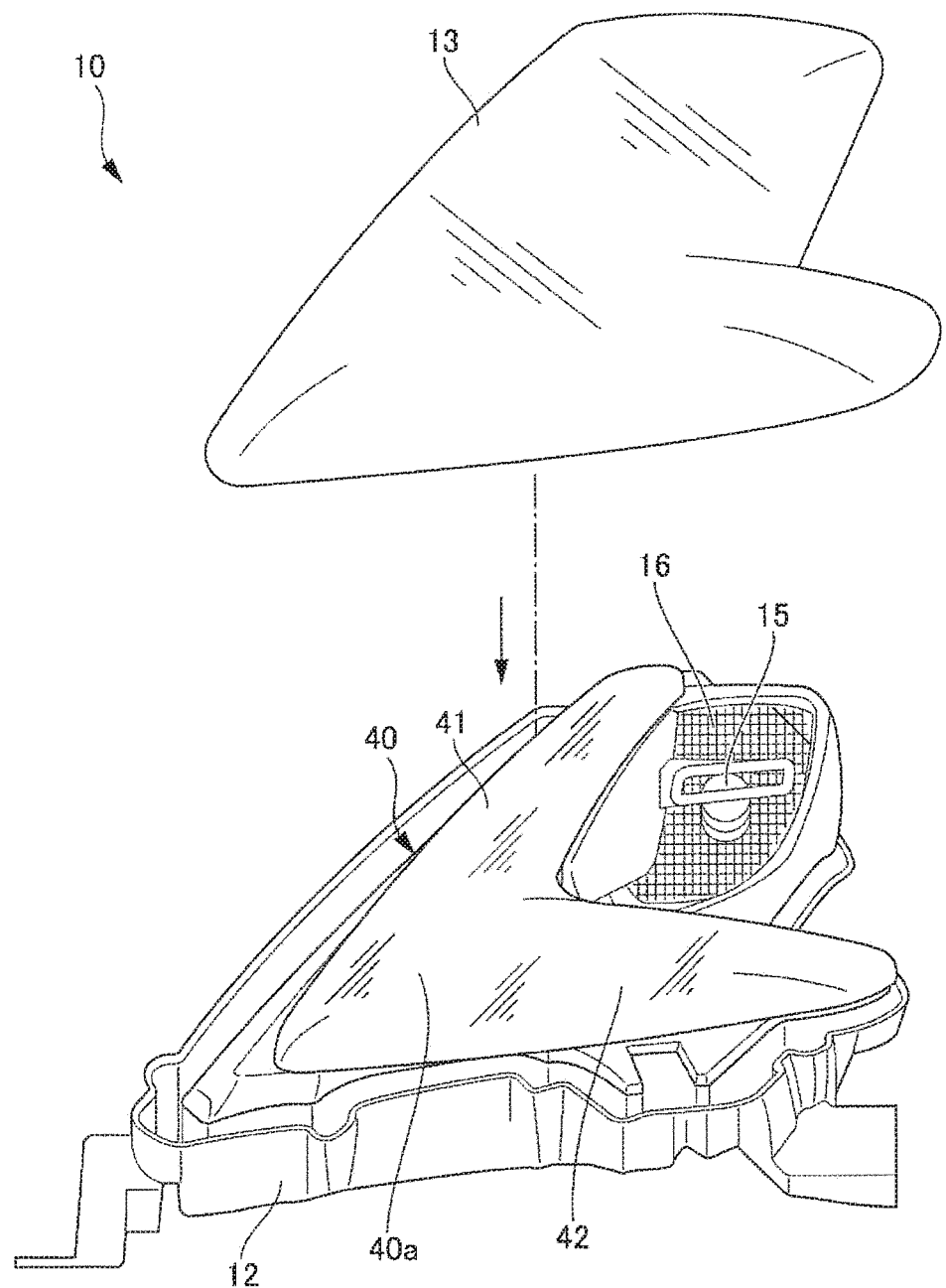
FIG. 3 is a perspective view showing a state in which an outer lens has been removed in the vehicular lamp fitting shown in FIG. 1.
Figure 4:
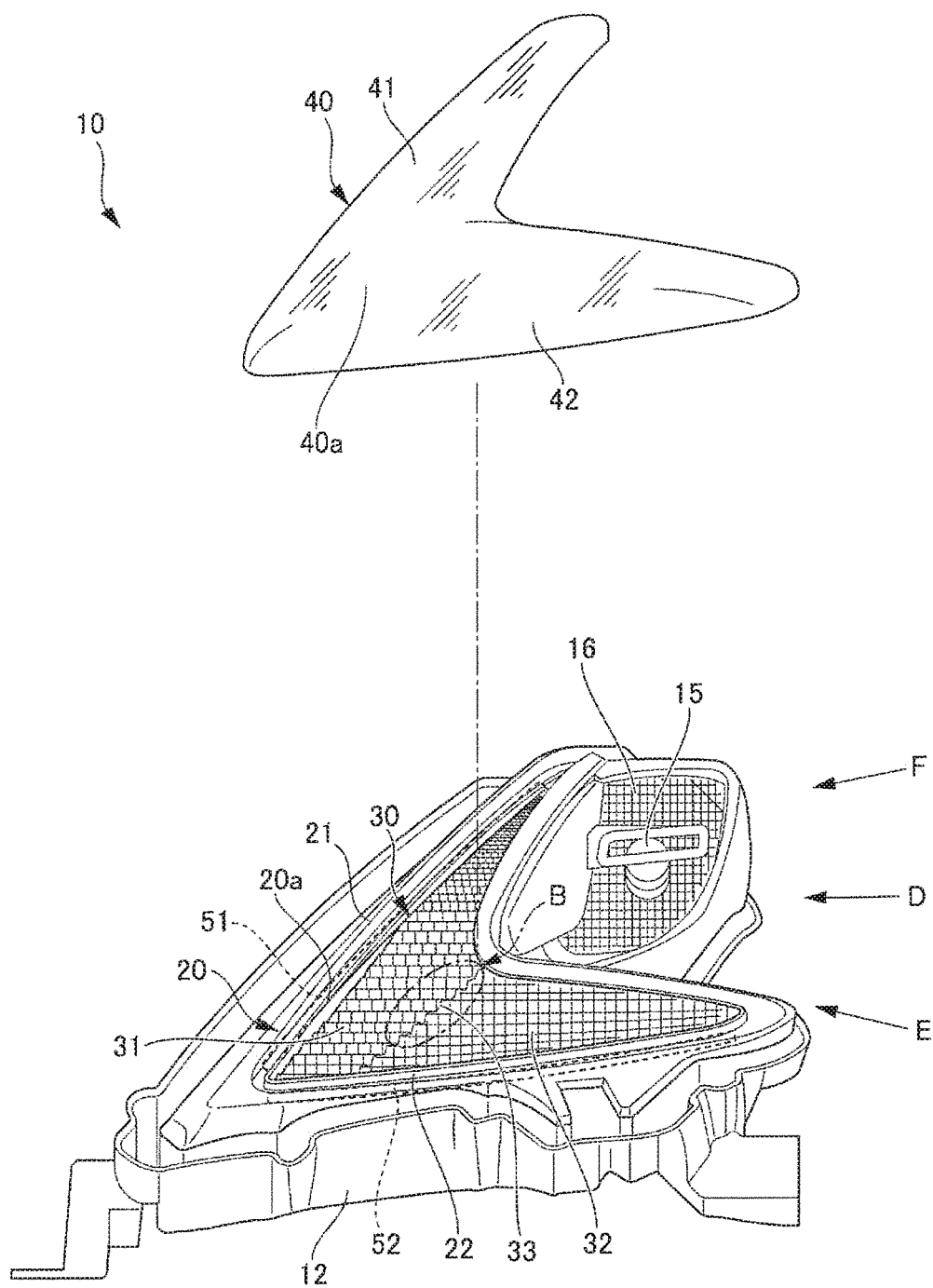
FIG. 4 is a perspective view showing a state in which an inner lens has been removed in the vehicular lamp fitting shown in FIG. 1

FIG. 2 is a sectional view taken along the line A-A of FIG. 1, and as shown in FIG. 2, the vehicular lamp fitting 10 is equipped with: a lamp body 12; an inner panel 20 which is supported by the lamp body 12; and a reflector 30 which is engaged with the inner panel 20; and an inner lens 40 which is provided at a surface side of the reflector 30. Also, as shown in FIG. 4, the reflector 30 has a first reflector portion 31 and a second reflector portion 32, and as shown in FIG. 2, is equipped with: a first light guide member 51 which is provided along an outer circumference (an edge part) 35 at the vehicular central side of the first reflector portion 31; and a second light guide member 52 which is provided along an outer circumference (an edge part) 36 at the vehicular outside of the second reflector portion 32. Further, as shown in FIG. 3, the vehicular lamp fitting 10 is equipped with an outer lens 13 to cover a surface side of the inner lens 40.

Of these constituent elements, the first light guide member 51, the second light guide member 52, the reflector 30, the inner lens 40, and light sources 61, 62 (refer to FIG. 10), which will be described later, are main elements which constitute a signal lamp or an illuminating lamp in the vehicular lamp unit 10. For example, a signal lamp or an illuminating lamp such as a clearance lamp (a vehicular width lamp) or a daytime running light (a daytime lamp) is included.

(Constituent Elements of Inner Lens 40 and Inner Panel 20)

Next, constituent elements of the inner lens 40 and the inner panel 20 will be described with reference to FIG. 4. As shown in FIG. 4, the inner lens 40 is formed in a shape which bends in a substantial L-shape, and has: a first lens portion 41 of which width is gradually smaller from the bent corner part 40a to the vehicular rear side; and a second lens portion 42 of which width is gradually smaller from the corner part 40a to the vehicular oblique rear side (the left oblique rear side). The first lens portion 41 and the second lens portion 42 are entirely facially irradiated with light by the light sources 61, 62 (refer to FIG. 10), which will be described later, the first light guide member 51, the second light guide member 52, and the reflector 30.

The thus facially light-emitted inner lens 40 can be visually recognized from the outside through an outer lens 13. It is to be noted that, at a portion which is sandwiched between the first lens portion 41 and the second lens portion 42 (at a position in a diagonal direction of the corner part 40a), a light source 15 and a reflector 16 which constitute a variety of illuminating lamps such as a headlamp or a variety of signal lamps may be disposed.

The inner panel 20 has an opening portion 20a which is formed in a substantial L-shape in accordance with an external shape of the inner lens 40. Peripheral edge parts of the opening portion 20a are composed of grooves or the like in which the inner lens 40 is to be engaged, for example. Of the peripheral edge parts, an edge part 21 at the vehicular central side is positioned on the first light guide member 51, and an edge part 22 at the vehicular outside is positioned on the second light guide member 52.

(Configuration of Reflector 30)

Figure 9:
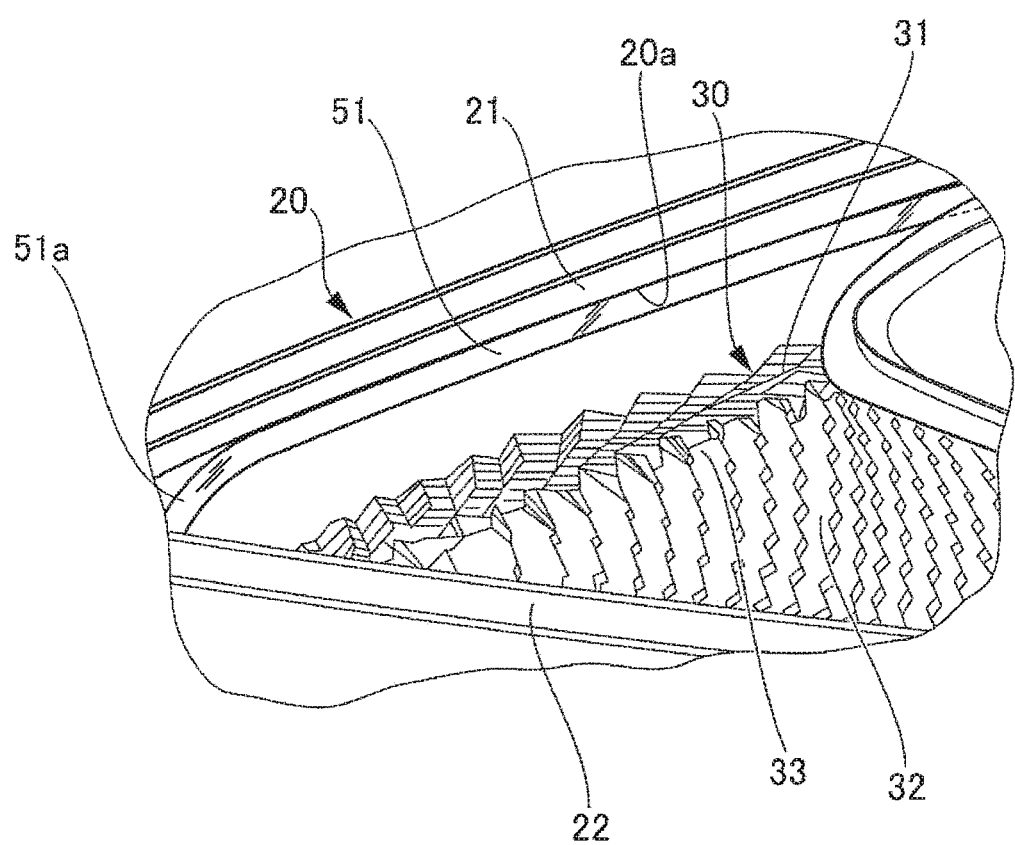
FIG. 9 is a view taken along the arrow F of FIG. 4, and is also a view in a case where the lamp fitting is seen at the vehicular lateral side and from an oblique upper side.

Next, a configuration of the reflector 30 will be described with reference to FIG. 4, FIG. 5, and FIG. 9. As shown in FIG. 4, the reflector 30 reflects the light from the first light guide member 51 and the second light guide member 52 to the vehicular front side in a predetermined light distribution pattern. The reflector 30 has: a first reflector portion 31 to reflect the light that has been emitted from the first light guide member 51, to the vehicular front side; and a second reflector portion 32 to reflect the light that has been emitted from the second light guide member 52, to the vehicular front side. More specifically, the first reflector portion 31 is provided at the vehicular central side more significantly than the second reflector portion 32, and the second reflector portion 32 is provided so as to come into contact with the first reflector portion 31 at a boundary part 33 at the vehicular central side.

Hereinafter, it is to be noted that there may also be a case in which the boundary part 33 is referred to as a contact portion.

Figure 5:
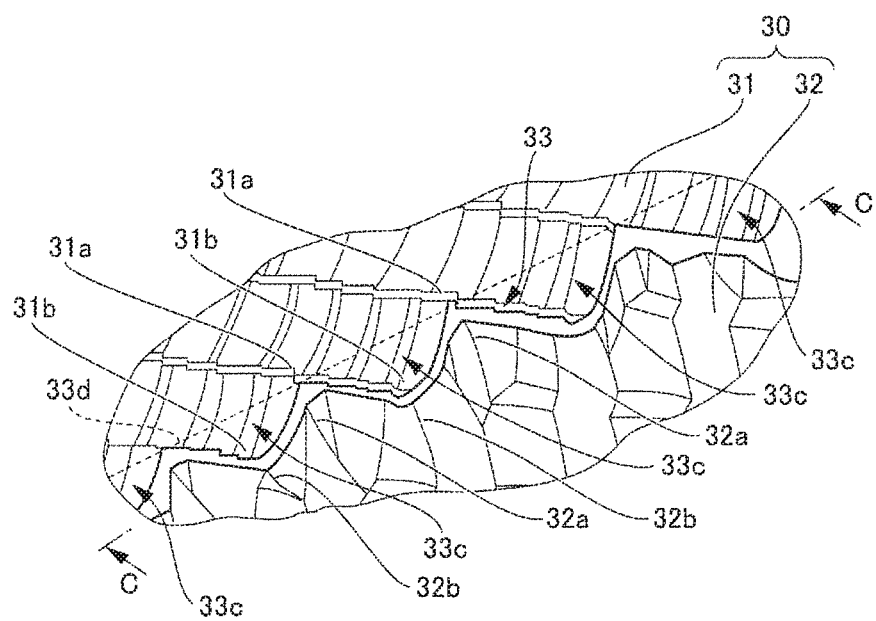
FIG. 5 (*a*) is an enlarged view of a portion B of FIG. 4, and is a view explaining a portion at which first and second reflector portions come into contact with each other, and FIG. 5 (*b*) is a view explaining a comparative example of FIG. 5 (*a*).
Figure 5:
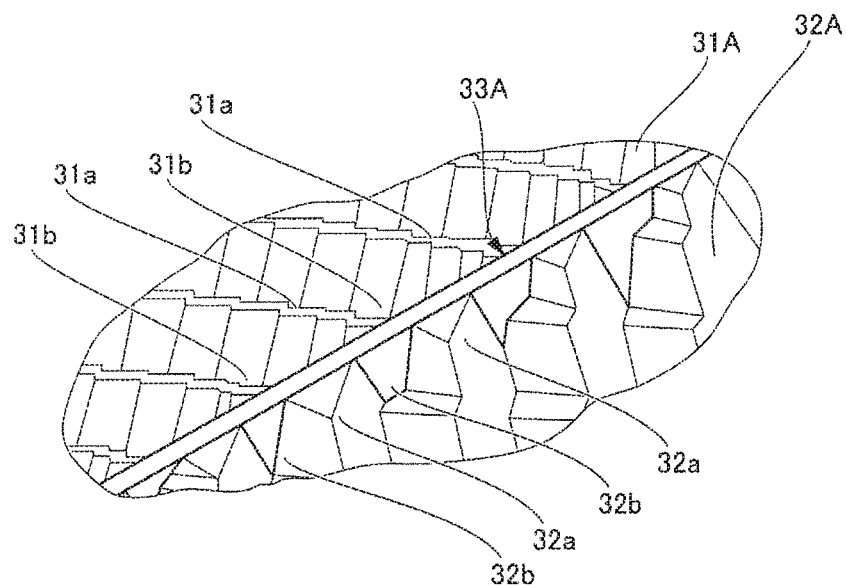

FIG. 5 (a) shows the portion B of FIG. 4 in an enlarged manner. Namely, in the figure, a part of the portion at which the first reflector portion 31 and the second reflector portion 32 come into contact with each other is shown in an enlarged manner. It is to be noted that, in the embodiment, the first reflector portion 21 and the second reflector portion 32 are formed to be integral with each other. However, there is no need to be limitative to the fact that the first reflector portion 31 and the second reflector portion 32 are formed to be integral with each other, and there may be a configuration such that the first reflector portion 31 and the second reflector portion 32 are formed to be separate from each other, and are aligned so as to be integrally connect to each other at the contact portion.

As shown in FIG. 5 (a), the portion at which the first reflector portion 31 and the second reflector portion 32 come into contact with each other is characterized in that mountain parts 31a, 32a are respectively formed so as to come into contact with each other, and valley parts 31b, 32b are respectively formed so as to come into contact with each other, and the mountain parts 31a, 32a and the valley parts 31b, 32b each are formed in a stepwise manner which is gradually higher at level towards the vehicular rear side. In addition, as shown in FIG. 9, the first reflector portion 31 and the second reflector portion 32 are formed so that the portion (the boundary part) 33 at which the first reflector portion 31 and the second reflector portion 32 come into contact with each other becomes high at level.

Hereinafter, a shape of the portion (the boundary part) 33 at which the first reflector portion 31 and the second reflector portion 32 come into contact with each other will be described. For example, in respect of the boundary part 33, as shown in FIG. 5 (b), it is also possible to simply form a shape such that the first reflector portion 31A and the second reflector portion 32A come into contact with each other at a wall-like alignment portion 33A. However, it is difficult to form the wall-like alignment portion 33A so as to be a reflection surface to reflect light to the vehicular front side in the same extent as that of another reflector portion, and when the lamp fitting is seen from the vehicular front side, it has been found that a linear dark part is prone to be produced along the wall-like alignment portion 33A.

Therefore, in place of an attempt to form the wall-like alignment portion 33A in such a shape of a reflection surface as to reflect the light in the same extent as that of another reflector portion, the Inventor changed his conceptual idea and then formed such a shape as to cut out the wall-like alignment portion 33A so that such a linear dark part is not produced, namely, formed a shape having a plurality of cutout parts 33c along the boundary part 33 as is the case with the boundary part 33 shown in FIG. 5 (a). More specifically, the dotted line 33d of FIG. 5 (a) and FIG. 7 indicates a position which abuts against a top edge of the wall-like alignment portion 33A shown in FIG. 5 (b), and as shown in FIG. 5 (a) and FIG. 7, the cutout parts 33c each are formed in such a shape as to cut out the wall-like alignment portion 33A from the top edge. The cutout parts 33a have been thus formed in the wall-like alignment portion 33A which is the linear dark part described with reference to FIG. 5 (b), so as to thereby eliminate the wall-like alignment portion 33A which is a cause of the linear dark part. As a result, the linear dark part does not appear, and the portion (the boundary part) 33 at which the first reflector portion 31 and the second reflector portion 32 come into contact with each other could also be seen in the same manner as that of another reflector portion.

(Constituent Elements of First Light Guide Member 51 and Second Light Guide Member 52)

Subsequently, the first light guide member 51 and the second light guide member 52 will be described with reference to FIG. 1, FIG. 4, FIG. 6 to FIG. 11, and FIG. 13.

Figure 6:
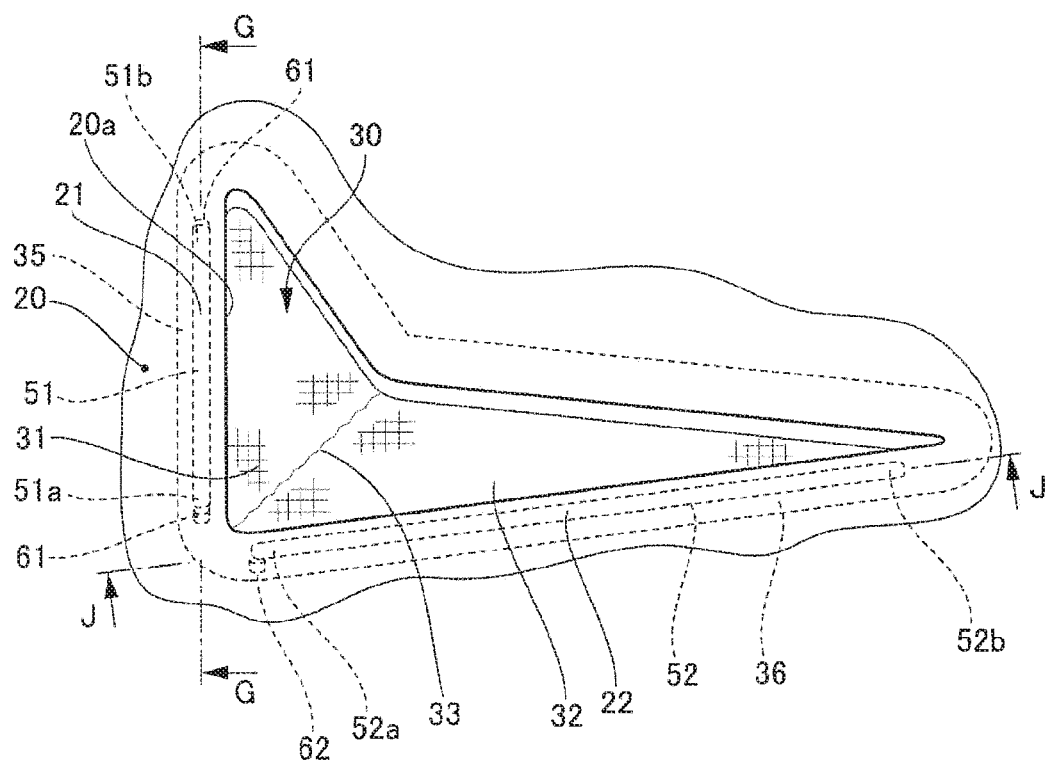
FIG. 6 is a schematic view in a case where layouts of a first light guide member and a second light guide member shown in FIG. 4 are seen from the vehicular front side.

As shown in FIG. 6, the first light guide member 51 is disposed upward of an outer circumference 35 at the vehicular central side of the reflector 30, and for example, extends in both of the forward and backward directions along a bonnet 17 (refer to FIG. 1) of the vehicular front part or a fender panel 18 (refer to FIG. 1). In addition, as shown in FIG. 4, the first light guide member 51 is kept at a position which is hidden by an edge part 21 of an inner panel 20 at the vehicular central side when the outer lens 13 (not shown) and the inner lens 40 are seen from the vehicular front side.

More precisely, this does not mean that the first light guide member 51 cannot be completely visually recognized from the vehicular front side by the edge part 21, but the edge part 21 covers almost all of the entirety so as to make it difficult to visually recognize the light guide member from the vehicular front side as much as possible. Thus, a part of the first light guide member 51 is kept at a position which can be visually recognized from the vehicular front side. However, the first light guide member 51 mainly emits the light to the first reflector portion 31 side and thus does not actively radiate the light to the vehicular front side; and therefore, even if the first light guide member 51 is seen from the vehicular front side, the member does not shine so much; and accordingly, a part which is not covered with the edge part 21 of the first light guide member 51 may be able to be visually recognized from the vehicular front side, whereas, most of the covered part is kept in a state of the order of being hardly recognized when the light guide member is seen from the vehicular front side.

The vehicular lamp fitting 10 of the embodiment, as shown in FIG. 1, is shown with respect to the case of being disposed to be entirely oriented to the vehicular upper side; and therefore, the first light guide member 51 is disposed upward with respect to the reflector 30; and however, depending on the specification required, there is a case of such a layout oriented in an oblique lateral direction; and in this case, the first light guide member 51 is disposed in the oblique lateral direction with respect to the reflector 30. Therefore, in so far as the layout of the first light guide member 51 with respect to the reflector 30 is concerned, in general, the first light guide member is disposed at a position which opposes to the reflector 30.

On the other hand, as shown in FIG. 6, the second light guide member 52 is disposed upward of the outer circumference 36 at the vehicular outside of the reflector 30, and extends in an oblique direction with respect to the vehicular forward and backward directions. For example, the second light guide member 52 extends along the bonnet 17 (refer to FIG. 1) of the vehicular front part or the fender panel 18 (refer to FIG. 1). In addition, as shown in FIG. 4, in respect of the second light guide member 52 as well, when the outer lens 13 (not shown) and the inner lens 40 are seen from the vehicular front side, these lenses are kept at the positions which are hidden at the edge part 22 of the inner panel 20 at the vehicular outside. In this manner, the second light guide member 52 is disposed so as not to be able to be visually recognized from the vehicular front side.

However, as is what has been described with respect to the first light guide member 51, the second light guide member 52 also mainly emits the light to the second reflector portion 32 side and thus does not actively radiate the light to the vehicular front side and thus is configured to be hardly recognized from the vehicular front side; and therefore, it is not meant that the second light guide member 52 has to be disposed at a position which is hidden at the edge part 22 so as not to be completely visually recognized from the vehicular front side. It is to be noted that, as has been described with respect to the first light guide member 51, the second light guide member 52 is also disposed upward of the reflector 30 in the embodiment; and however, more generally, the second light guide member 52 is disposed so as to oppose to the reflector 30.

Further, the first light guide member 51 is disposed so that the light from the first light guide member 51 can be visually recognized from the vehicular lateral side (for example, a person who is standing at a front tire 19 side (refer to FIG. 1)) via the outer lens 13 (refer to FIG. 3) and the inner lens 40 (refer to FIG. 3). For example, in a state in which the outer lens 13 and the inner lens 40 have been removed, when the first light guide member 51 is seen in the horizontal direction as in the direction indicated by the arrow D of FIG. 4 in the vehicular side face view, the front halved part can be visually recognized (refer to FIG. 7), and even when the light guide member is seen from the oblique lower side as in the direction indicated by the arrow E of FIG. 4, at least a part of the front side can be visually recognized (refer to FIG. 8). In addition, when the first light guide member 51 is seen from the oblique upper side in the vehicular side face view as in the direction indicated by the arrow F of FIG. 4, a major part of the first light guide member 51 can be visually recognized (refer to FIG. 9).

Next, examples of shapes of end parts of the first light guide member 51 and the second light guide member 52 and examples of layout of the light sources 61, 62 will be described.

Figure 10:
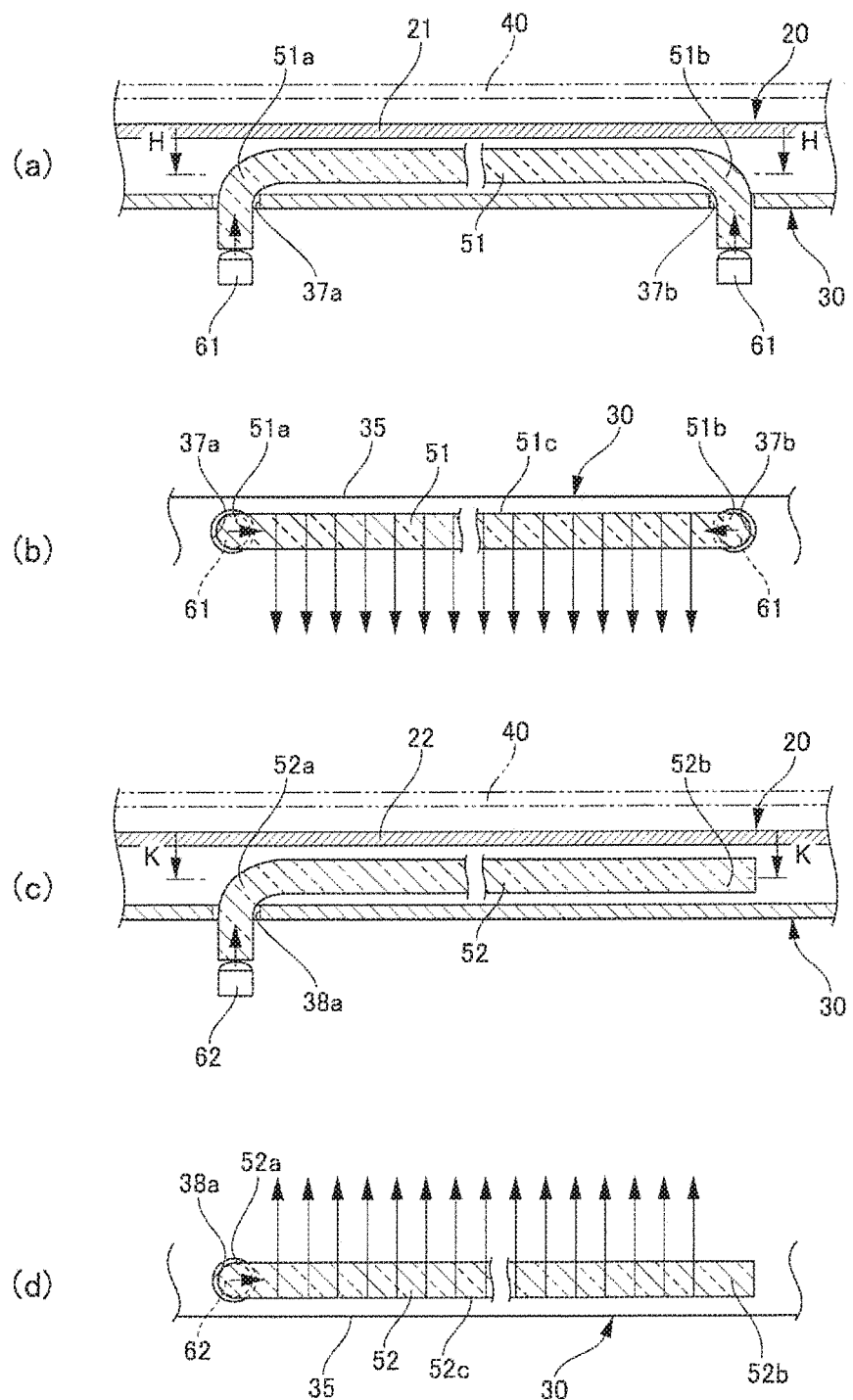
FIG. 10 (*a*) is a sectional view taken along the line G-G of FIG. 6.

As shown in FIG. 10 (a) which is a sectional view taken along the line G-G of FIG. 6, the first light guide member 51 has a first front end part 51a at the vehicular front side and a first rear end part 51b at the vehicular rear side. The first front end part 51a and the first rear end part 51b bend to a back face side of the reflector 30, and in the reflector 30, a first front side hole 37a and a first rear side hole 37b for routing the bent first front end part 51a and the first rear end part 51b, respectively, to the back face side of the reflector 30, are provided.

In this manner, the first front end part 51a and the first rear end part 51b are disposed at the back face side of the reflector 30 through the first front side hole 37a and the first rear side hole 37b, respectively. A light source (for example, a light emitting diode) 61 to make light incident into the first light guide member 51 is disposed at the back face side of the reflector 30 so as to oppose to the first front end part 51a and the first rear end part 51b, respectively.

In addition, as shown in FIG. 10 (b) which is a sectional view taken along the line H-H of FIG. 10 (a), at the first light guide member 51, a reflection surface (a prism surface) 51c is provided along a longitudinal direction of the first light guide member 51, and the reflection surface 51c reflects the light that is guided inside of the first light guide member 51, to the first reflector portion 31 (refer to FIG. 4) side of the reflector 30.

More specifically, the light that has been radiated from the light source 61 and then has been made incident to the first light guide member 51 is deflected by the reflection surface 51c while being guided in the first light guide member 51, and the light exceeding a critical angle is sequentially emitted to the first reflector portion 21 (refer to FIG. 4) side of the reflector 30. In addition, the light that has been reflected by the reflection surface 51c and then to be emitted to the first reflector portion 31 side is irradiated with the spread of the order of ±20 degrees with reference to the reflection surface 51c, for example.

Figure 11:
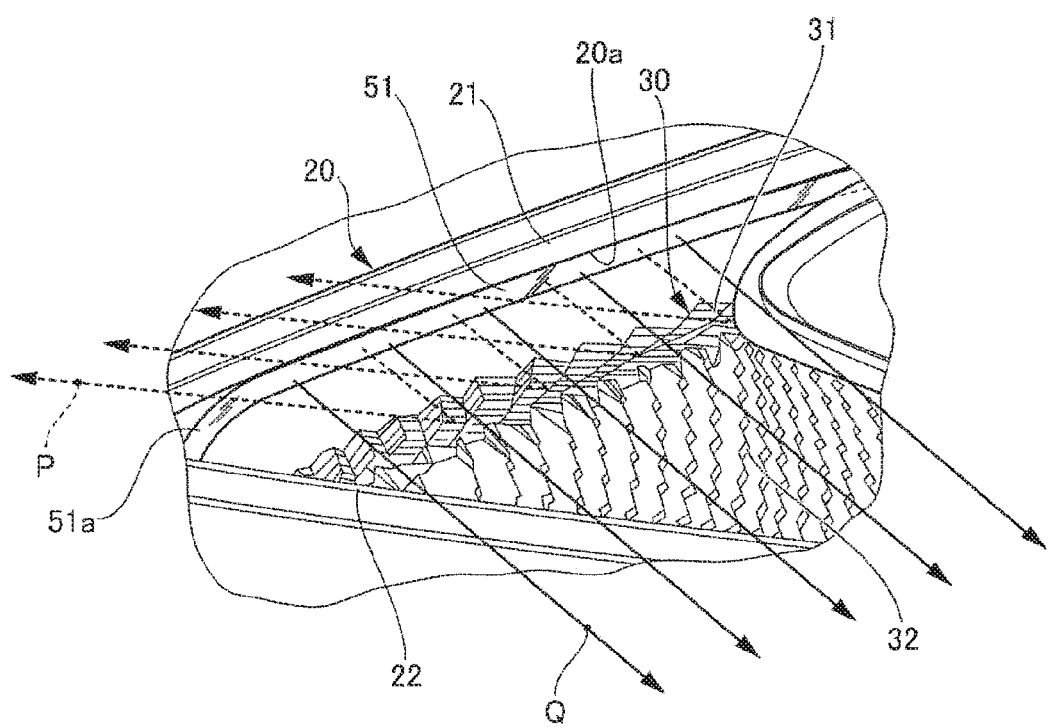
FIG. 11 is a view of a function of FIG. 7, and is also a view showing reflection light by the reflector and direct light from the first light guide member.
Figure 13:
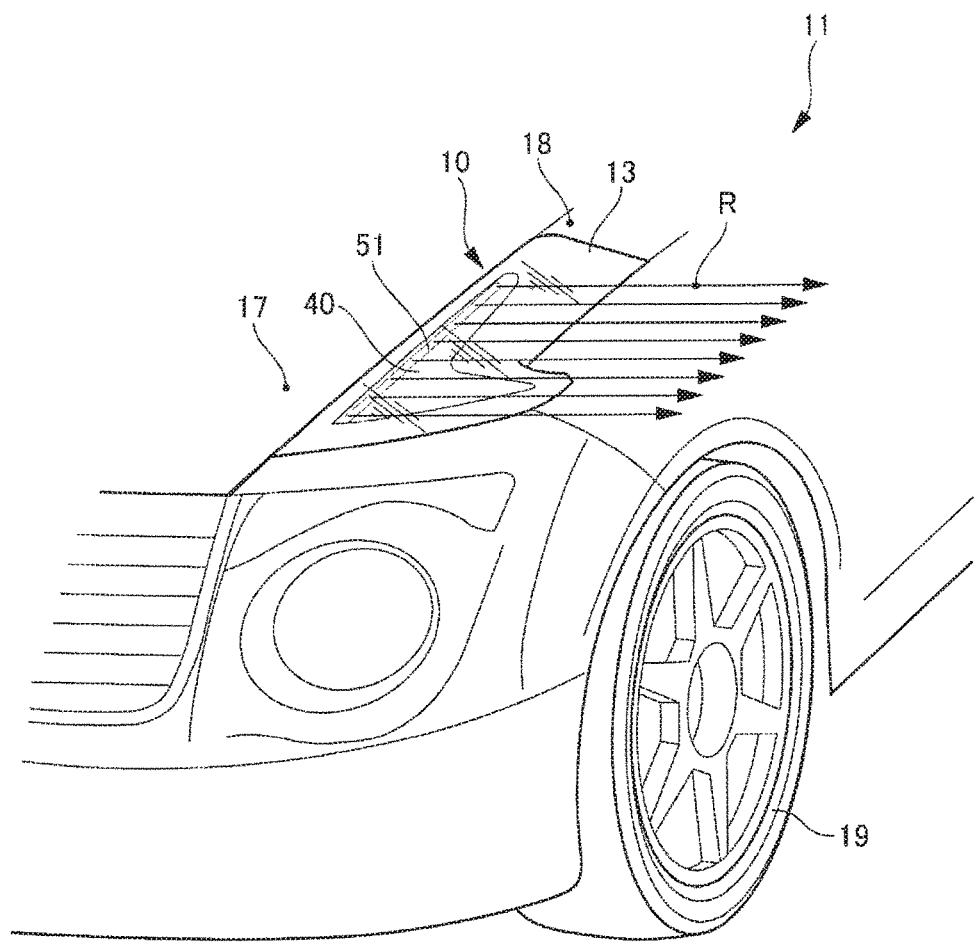
FIG. 13 is a view of an action of FIG. 1, and is also a view showing direct light from the first light guide member.

Thus, as shown in FIG. 11, a part of the light that has been emitted from the first light guide member 51 is radiated to the vehicular front side by the first reflector portion 31, and the partial light travels to the vehicular lateral side without being reflected (radiated) to the vehicular front side by the first reflector portion 31. As described previously, the first light guide member 51 can be visually recognized from the vehicular front side and thus the light from the first light guide member 51 that travels to the vehicular lateral side, as indicated by the arrow R of FIG. 13, is radiated to the vehicular lateral side; and therefore, the visibility from the vehicular lateral side can be improved.

In addition, as described previously, at the portion (the boundary part) 33 at which the first reflector portion 31 and the second reflector portion 32 come into contact with each other, the cutout parts 33c are formed along the boundary part 33. Thus, in the case of the wall-like alignment portion 33A shown in FIG. 5 (b), the direct light from the first light guide member 51, which is to be blocked by the wall-like alignment portion 33, is also radiated to the vehicular lateral side through the cutout parts 33c. Therefore, the cutout parts 33c are formed, and the visibility from vehicular lateral side can be thereby further improved.

On the other hand, as shown in FIG. 10 (c) which is a sectional view taken along the line J-J of FIG. 6, the second light guide member 52 has a second front end part 52a at the vehicular central side and a second rear end part 52b at the vehicular outside. In this example, the second front end part 52a bends to the back face side of the reflector 30, and in the reflector 30, a second front side hole 38a for routing the bent second front end part 52a to the back face side of the reflector 30 is provided.

In this manner, the second front end part 52a is disposed at the back face side of the reflector 30 through the second front side hole 38a. A light source (for example, a light emitting diode) 62 to make light into the second light guide member 52 is disposed at the back face side of the reflector 30 so as to oppose to the second front end part 52a.

In addition, as shown in FIG. 10 (d) which is a sectional view taken along the line K-K of FIG. 10 (c), in the second light guide member 52 as well, a reflection surface (a prism surface) 52c is provided along the longitudinal direction of the second light guide member 52, and the reflection surface 52c reflects the light that is guided in the second light guide member 52, to the second reflector portion 32 (refer to FIG. 4) side of the reflector 30.

More specifically, the light that has been radiated from the light source 62 and then has been made incident to the second light guide member 52 is deflected by the reflection surface 52c while being guided in the second light guide member 52; the light exceeding the critical angle is sequentially emitted to the second reflector portion 32 (refer to FIG. 4) side of the reflector 30; and the light that has been emitted to the second reflector portion 32 (refer to FIG. 4) side is radiated to the vehicular front side by the second reflector portion 32.

Incidentally, although the foregoing embodiment was described with respect to the case in which the light source 61 is provided at each end part of the first front end part 51a at the vehicular front side of the first light guide member 51 and the first rear end part 51b at the vehicular rear side, the light source 61 may be provided at least at one of the first front end part 51a and the first rear end part 51b without being limitative thereto. Similarly, although the foregoing embodiment was described with respect to the case in which the light source 62 is provided at the second front end part of the second light guide member 52, without being limitative thereto, it may be that the light source 62 is provided at the second rear end part 52b of the second light guide member 52 or that the light source 62 is provided at each end part of the second front end part and the second rear end part.

However, if a light source is provided at a position which can be easily visually recognized when the light source is seen from the vehicular front side, there may be a case in which a structure to hide the light source is required. In such a case, the vicinity of the hidden light source becomes dark, and the appearance is impaired. Thus, it is preferable that a light source is not provided at the position which can be easily visually recognized when the light source is seen from the vehicular front side (in the embodiment, at the second rear end part 52b).

Functions and advantageous effects of the first embodiment will be described. According to the embodiment, the first light guide member 51 and the second light guide member 52 are disposed in a state in which most portions are hidden so as to be hardly visually recognized from the vehicular front side by the edge parts 21, 22 of the inner panel 20 and thus the appearance when these members are seen from the vehicular front side is improved.

In addition, the light that is emitted from the first light guide member 51 and the second light guide member 52 are intended to be emitted to the reflector 30 (the first reflector portion 31 and the second reflector portion 32) side, and the direct light from the first light guide member 51 and the second light guide member 52 is adapted so as not to be oriented to the vehicular front side so much; and therefore, even if a part of the first light guide member 51 and the second light guide member 52 is seen from the edge parts 21, 22 of the inner panel 20, the first light guide member 51 and the second light guide member 52 are intended to be hardly visually recognized from the vehicular front side.

Figure 12:
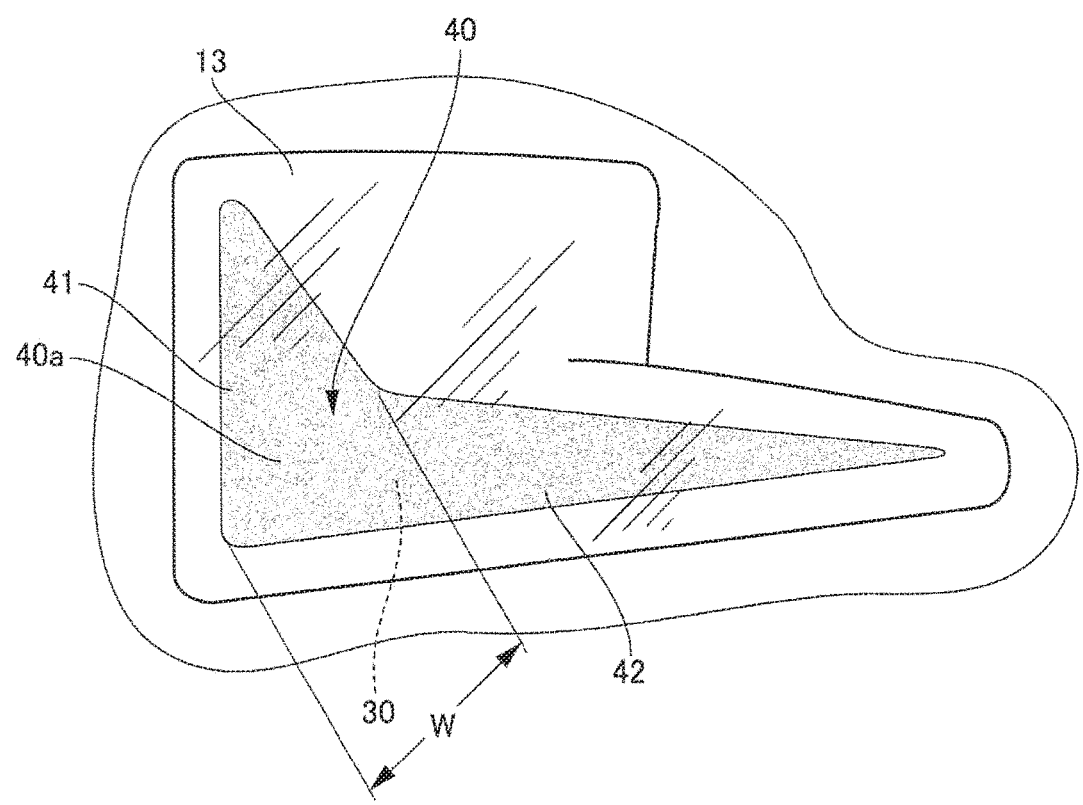
FIG. 12 is a view of a function of FIG. 6, and is also a view showing an inner lens to which light has been facially emitted.

Further, the entirety of the inner lens 40, when the inner lens is seen from the vehicular front side, is visually recognized so that the lens has been uniformly facially illuminated (refer to FIG. 12) with the light that has been reflected by the reflector 30 (the first reflector portion 31 and the second reflector portion 32) and then has been radiated to the vehicular front side (the arrow P of FIG. 11). It is to be noted that, in FIG. 11, the light from the first light guide member 51 is shown, and the light from the second light guide member 52 is not shown. Therefore, there is no case in which a dark or bright matter is produced in the inner lens 40 and the appearance is impaired, and it is possible to obtain a signal lamp or an illuminating lamp without a difference in brightness when the lamp is seen from the vehicular front side.

Furthermore, in a case where a reflector is configured to be made of the first reflector portion and the second reflector portion, as has been described with reference to FIG. 5 (b), a linear dark part is prone to be produced along a portion (a wall-like alignment portion) 33A at which the first reflector portion 31A and the second reflector portion 32A come into contact with each other. Therefore, as shown in FIG. 5 (a), the cutout parts 33C has been provided along the portion (the boundary part) 33 at which the first reflector portion 31 and the second reflector portion 32 come into contact with each other, so as to thereby prevent production of the linear dark part.

In a case where the linear dark part is produced, if a width W (refer to FIG. 12) of the corner part 40a of the inner lens 40 increases, the linear dark part also becomes elongated, and is easily visually recognized; and however, as described above, the cutout parts 33c have been formed along the portion (the boundary part) 33 at which the first reflector portion 31 and the second reflector portion 32 come into contact with each other, whereby even in the case where the width W (refer to FIG. 12) of the corner part 40a of the inner lens 40 is large, such a linear dark part as is visually recognized does not appear on the inner lens 40; and therefore, it is possible to obtain more appropriate facial light emission.

Figure 7:
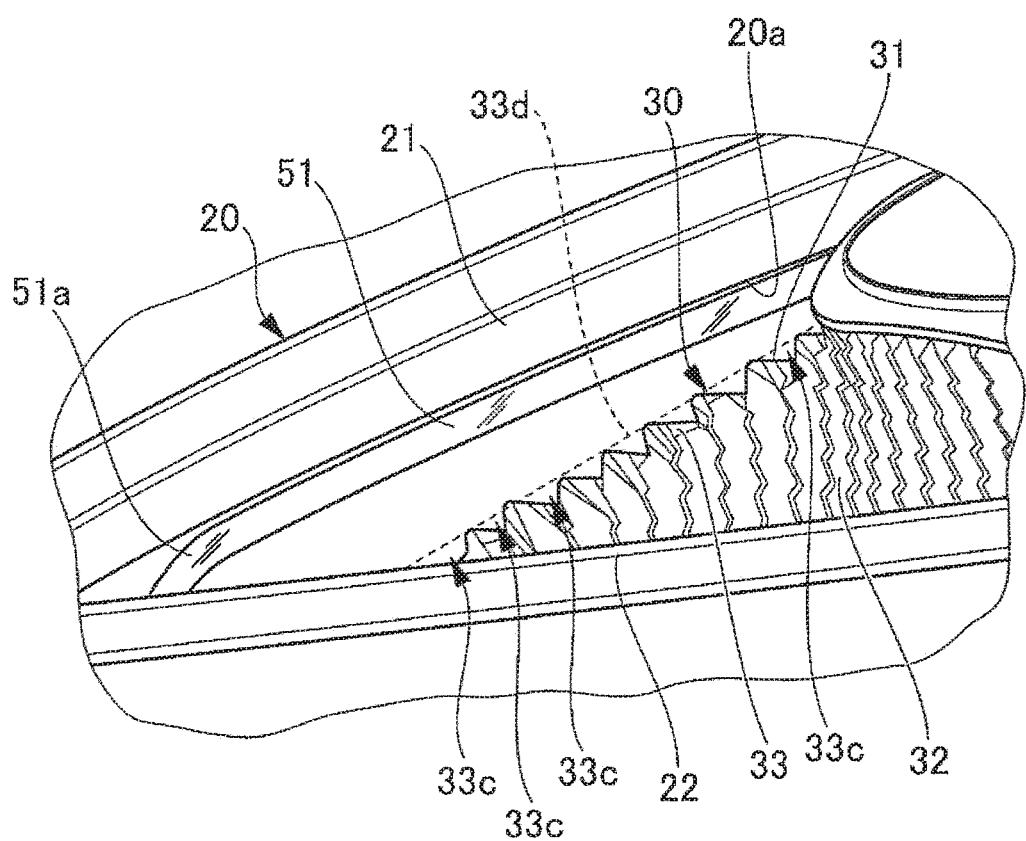
FIG. 7 is a view taken along the arrow D of FIG. 4, and is also a view in a case where the lamp fitting is seen at a vehicular lateral side and in a horizontal direction.
Figure 8:
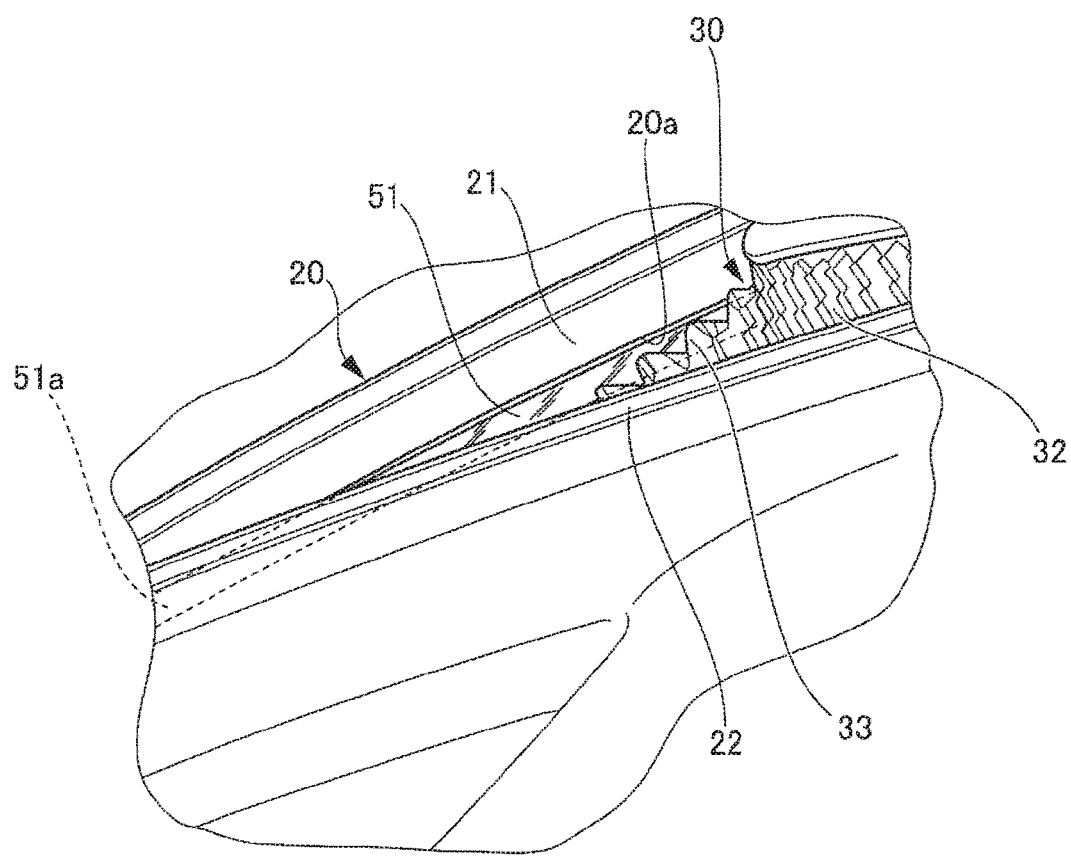
FIG. 8 is a view taken along the arrow E of FIG. 4, and is also a view in a case where the lamp fitting is seen at the vehicular lateral side and from an oblique lower side.

Further, as shown in FIG. 7, the portion (the boundary part) 33 at which the first reflector portion 31 and the second reflector portion 32 come into contact with each other approaches the vehicular side from the vehicular rear side (the right side of FIG. 7) towards the vehicular front side (the left side of FIG. 7), whereby a rate of direct light from the first light guide member 51, which is radiated to the vehicular lateral side without being shaded by the reflector 30, increases, and it is possible to obtain good visibility from the vehicular lateral side.

In addition, as shown in FIG. 7, the reflector 30 has the cutout parts 33c of which shape is formed by cutting the portion (the boundary part) 33 at which the first reflector portion 31 and the second reflector portion 32 come into contact with each other; and therefore, through the cutout parts 33c, the direct light from the first light guide member 51 is further radiated to the vehicular lateral side, so that a higher visibility from the vehicular lateral side can be obtained. Such a vehicular lamp fitting 10 is effective, in particular, for a signal lamp or an illuminating lamp such as a clearance lamp of which visibility from the vehicular lateral side is desired.

In the embodiment, through the first front side hole 37a and the first rear side hole 37b that have been provided in the reflector 30, the first front end part 51a and the first rear end part 51b of the first light guide member 51 have been disposed at the rear face side of the reflector 30, and the light source 61 has been provided at each of the first front end part 51a and the first rear end part 51b. In addition, through the second front side hole 38a that has been provided in the reflector 30, the second front end part 52a of the second light guide member 52 has been disposed at the back face side of the reflector 30, and the light source 62 has been provided at the second front end part 52a. The first light guide member 51, the second light guide member 52, and the light sources 61, 62 are thus configured, and the respective light sources 61, 62 have been thereby disposed at the back face side of the reflector 30; and therefore, the light sources and the board or the like on which the light sources are to be provided are hardly visually recognized when the vehicular lamp fitting 10 is seen, and the vehicular lamp fitting 10 with its good appearance is obtained.

Incidentally, as in the embodiment, even if the first reflector portion and the second reflector portion are not such reflection surfaces respectively having the mountain parts and the valley parts, if there is a linear portion (a boundary part) at which the first reflector portion and the second reflector portion come into contact with each other, it is considered that this portion is prone to be different in reflection state from another portion. In addition, if a shape obtained by cutting the linear portion (the boundary part) is formed, the light that is reflected from the reflection surfaces of the first reflector portion and the second reflector portion, and that are adjacent to the linear portion (the boundary part), is radiated to a portion of the inner lens that opposes to the boundary part, through the cutout parts, without being blocked at the linear portion (the boundary part); and therefore, it is estimated that a linear dark part is unlikely to be produced.

From this fact, in a case where a reflector is configured so as to have the portion (the boundary part) at which the first reflector portion and the second reflector portion come into contact with each other, it is considered that the plurality of cutout parts are provided along the contact portion (the boundary part), and there can be thereby attained an advantageous effect of restraining a linear dark part which appears at the contact portion (the boundary part).

Therefore, in the case of employing such a reflector having the portion (the boundary part) at which the first reflector portion and the second reflector portion come into contact with each other, providing the plurality of cutout parts along the portion (the boundary part) at which the first reflector portion and the second reflector portion come into contact with each other is considered to be a preferred configuration to obtain a uniform facial light emission state of an inner lens.

In addition, although the foregoing embodiment was shown with respect to the case in which the appearance when the light source is seen from the vehicular front side is improved with a simple configuration that the first light guide member 51 and the second light guide member 52 are hardly visually recognized from the vehicular front side by the edge parts 21, 22 of the inner panel 20, in terms of improvement of the appearance, the first light guide member 51 and the second light guide member 52 do not need to be hardly visually recognized from the vehicular front side by utilizing the edge parts 21, 22 of the inner panel 20, and the first light guide member 51 and the second light guide member 52 may be hardly visually recognized from the vehicular front side with another configuration. Further, although the foregoing embodiment was shown with respect to the case in which the reflector 30 is configured to be made of the first reflector portion 31 and the second reflector portion 32, the reflector 30 is not limitative to the one that is made of two reflector portions, and the reflector 30 may be configured to be made of only the first reflector portion 31 as required.

Second Embodiment

Figure 14:
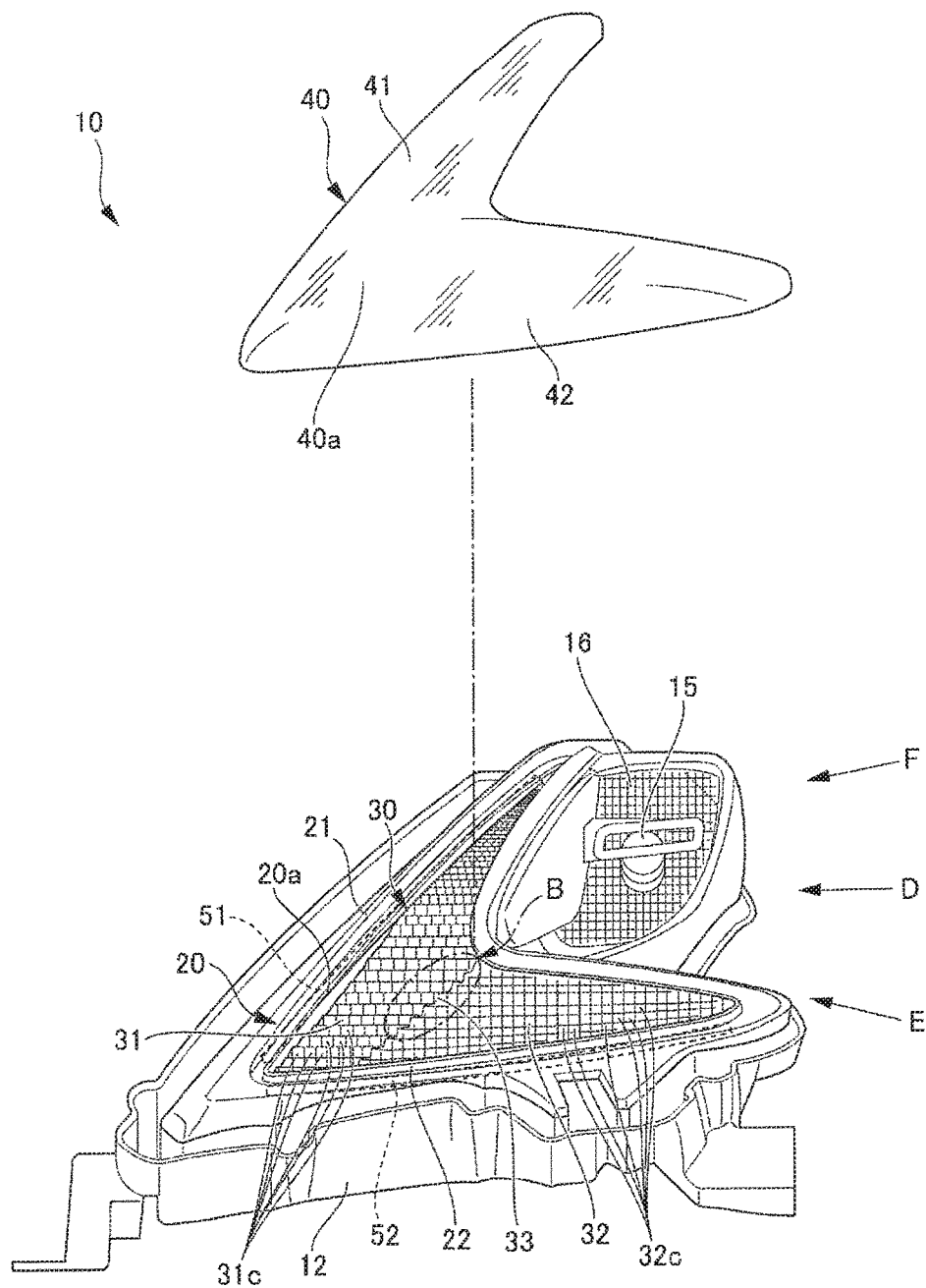
FIG. 14 is a perspective view showing a state in which an inner lens has been removed in a vehicular lamp fitting of a second embodiment according to the present invention.
Figure 15:
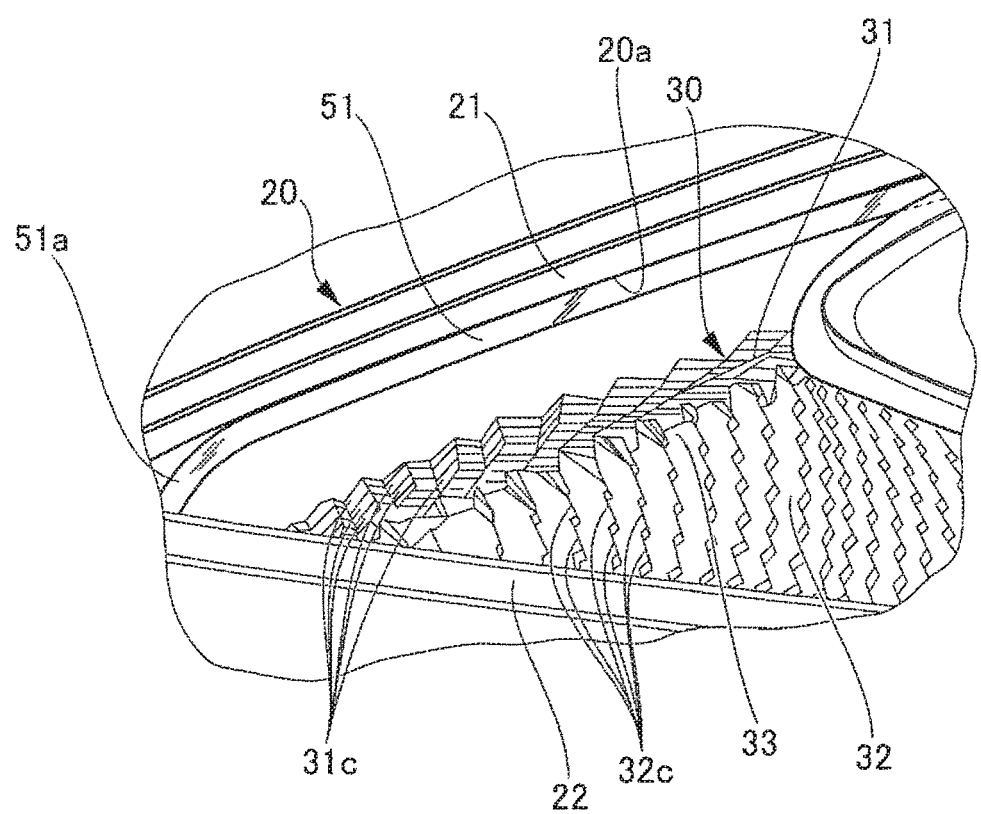
FIG. 15 is a view taken along the arrow F of FIG. 14, and is also a view in a case where the lamp fitting is seen at the vehicular lateral side and from an oblique upper side.

Hereinafter, a vehicular lamp fitting of a second embodiment according to the present invention will be described with reference to FIG. 14 and FIG. 15. It is to be noted that, in the description of the second embodiment, the same constituent elements as those employed in the first embodiment described above are assigned by the same reference numerals, and a duplicate description is omitted.

An overview of the vehicular lamp fitting in the second embodiment will be described. As shown in FIG. 14, a vehicular lamp fitting 10 is the vehicular lamp fitting 10 that is disposed at the vehicular front side, and is equipped with a reflector 30 to reflect light to the vehicular front side; and the reflector 30 has a first reflector portion 31 which is provided at the vehicular central side and further the first reflector portion 31 is disposed so as to be oriented to the vehicular upper side and is provided so as to be oriented to the lower side towards the vehicular front side.

According to the second embodiment of the present invention, it is possible to provide a vehicular lamp fitting which emits light uniformly when it is seen from the vehicular front side, of which appearance is good, and moreover, of which visibility from the vehicle lateral side is more remarkably improved.

Next, the vehicular lamp fitting in the second embodiment will be described in detail. In the case of the second embodiment, in a case where the vehicular lamp fitting 10 has been disposed in a vehicle as shown in FIG. 1, as shown in FIG. 14, the first reflector portion 21 is disposed so as to be oriented to the vehicular upper side, and is provided so as to gently oriented to the lower side from the vehicular rear side towards the vehicular front side without being completely horizontally disposed. In addition, as shown in FIG. 14, the first reflector portion 31 and the second reflector portion 32 respectively have a plurality of reflection surfaces 31c, 32c for reflecting light to the vehicular front side, and as shown in FIG. 15, these reflection surfaces 31c, 32c each are provided in a stepwise manner from the vehicular front side to the vehicular rear side. In more detail, reflection surface portions on which the plurality of reflection surfaces 31c, 32c each have been arranged in a columnar shape are provided in a stepwise manner from the vehicular front side to the vehicular rear side. The plurality of reflection surfaces 31c, 32c are thus formed, whereby the reflection direction of the light of each of the reflection surfaces 31c, 32c can be individually controlled, and when the lamp fitting is seen from the vehicular front side, light distribution control is easily exercised such that the inner lens 40 facially emits light uniformly as a whole.

Hereinafter, with reference to FIG. 5, a description of the reflector 30 will be furnished. FIG. 5 (a) shows the portion B of FIG. 14 in an enlarged manner. Namely, in the figure, a part of the portion at which the first reflector portion 31 and the second reflector portion 32 come into contact with each other is shown in an enlarged manner. It is to be noted that, in the second embodiment, the first reflector portion 31 and the second reflector portion 32 are formed to be integral with each other. However, there is no need to be limitative to the fact that the first reflector portion 31 and the second reflector portion 32 are formed to be integral with each other, and there may be a configuration such that the first reflector portion 31 and the second reflector portion 32 are formed to be separate from each other, and are aligned so as to integrally connect to each other at the contact portion.

Functions and advantageous effects of the second embodiment will be described. The first reflector portion 31 and the second reflector portion 32 have been intended to form the plurality of reflection surfaces 31c, 32c that reflect light to the vehicular front side, so that the reflection direction of the light of each of the reflection surfaces 31, 32c can be individually controlled, and when the lamp fitting is seen from the vehicular front side, light distribution control is easily exercised such that the inner lens 40 facially emits light uniformly as a whole. According to the second embodiment of the present invention, it is possible to provide a vehicular lamp fitting which emits light uniformly when it is seen from the vehicular front side, of which appearance is good, and moreover, of which visibility from the vehicular lateral side is more remarkably improved.

Third Embodiment

Hereinafter, a vehicular lamp fitting of a third embodiment according to the present invention will be described with reference to FIG. 16 to FIG. 19.

Figure 19:
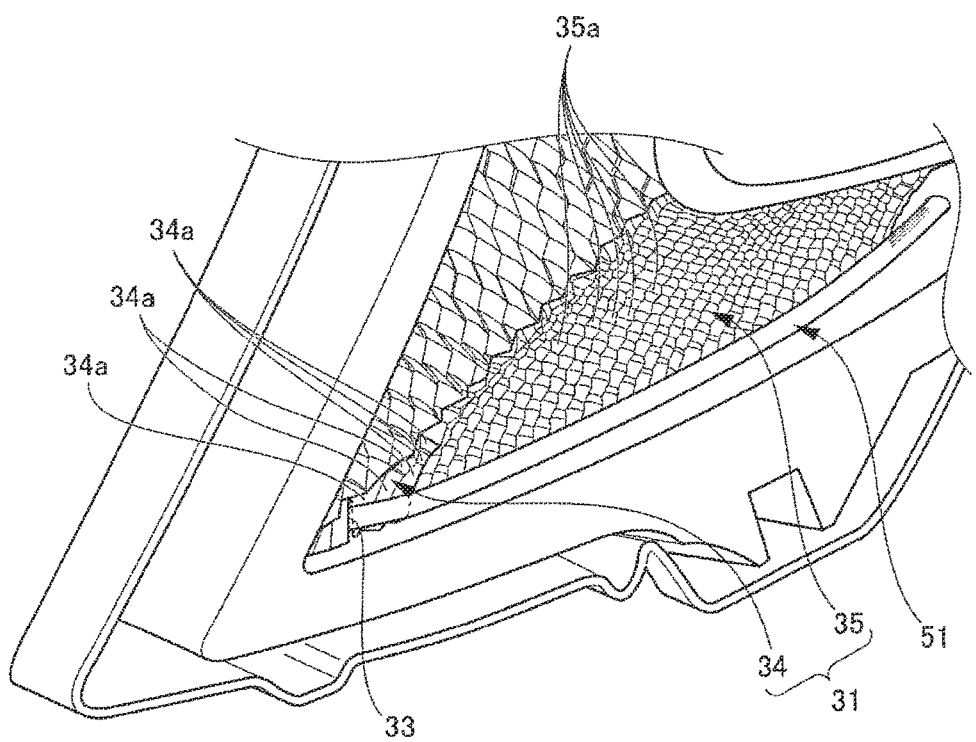
FIG. 19 is a perspective view of a portion A of FIG. 16 in an enlarged manner, and is also a view in a case where the inner lens and the outer lens have been omitted.

An overview of the vehicular lamp fitting in the third embodiment will be described. As shown in FIG. 19, the vehicular lamp fitting 10 in the third embodiment of the present invention is equipped with: a light guide member 51; a reflector 31 which is provided along the light guide member 51, and reflects light from the light guide member 51; and a light source which is provided at a vehicular central side of the reflector 31, and makes light incident to an end part of the light guide member 51, and the reflector 31 has a first reflection portion 34 to reflects the light into a vehicle which is provided at the light source side. According to the third embodiment of the present invention, it is possible to provide a vehicular lamp fitting employing a light guide member which is capable of carrying out good radiation of light into a vehicle.

Next, the vehicular lamp fitting in the third embodiment of the present invention will be described in detail.

Conventionally, there is known a vehicular lamp fitting in which light from a light source is made incident to a light guide member and then the light that has been emitted from the light guide member is reflected by a reflector (refer to Japanese Unexamined Patent Application Publication No. 2010-146828). On the other hand, in recent years, there have been many vehicular lamp fittings disposed in front of a vehicle, formed to slant from the vehicular front side to the rear side, and hardly radiating light to the vehicular inside (refer to Japanese Unexamined Patent Application Publication No. 2009-146761).

In comparison with a conventional light source of bulb type, the light guide member is small in light emission angle and thus the spread of the emitted light is small, and if the light guide member is disposed in accordance with a slant shape of the vehicular lamp fitting, there is a problem that radiation of light to the vehicular inside is hardly carried out.

The third embodiment of the present invention has been made in view of such a circumstance, and it is an object of the third embodiment to provide a vehicular lamp fitting employing a light guide member which is capable of carrying out good radiation of light to the vehicular inside.

Figure 17:
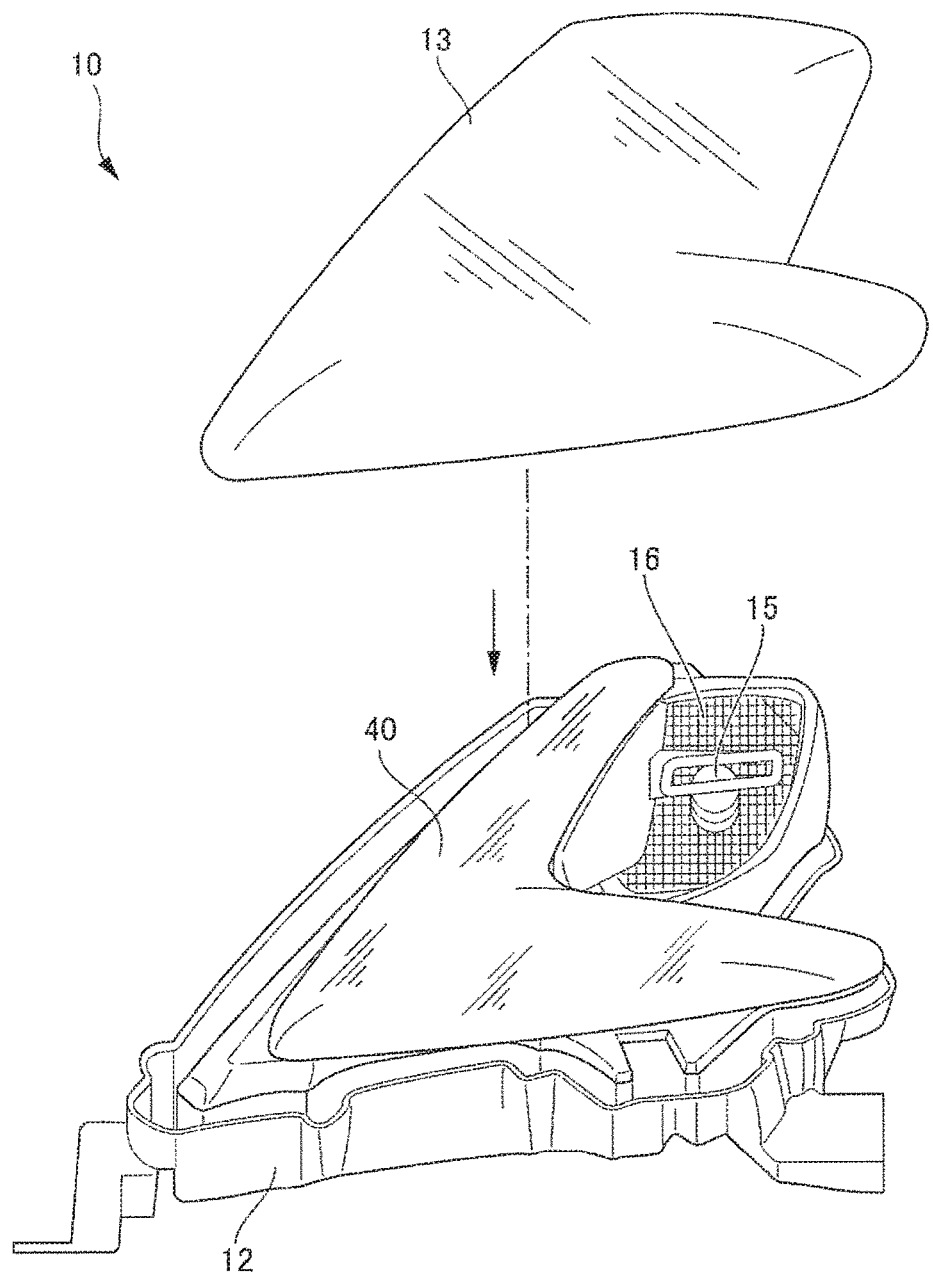
FIG. 17 is an exploded view in a case where an outer lens of the vehicular lamp fitting of FIG. 16 has been removed.

FIG. 17 is a view showing only portions of the vehicular lamp fitting 10 and shows a state in which an outer lens 13 has been removed. As shown in FIG. 17, the vehicular lamp fitting 10 is characterized in that the outer lens 13 is mounted so as to cover a front face of a housing 12, a lamp room is formed of the housing 12 and the outer lens 13, and in the lamp room, constituent elements (such as a reflector 16, a light source 15, and an inner lens 40) are provided. Incidentally, although the light source 15 is a signal lamp (for example, a turn lamp) or the like, this is not always required for the vehicular lamp fitting 10, and in a case where a signal lamp or the like as a vehicular lamp fitting is provided in a vehicle 11, the constituent elements of the reflector 16 and the light source 15 may be omitted.

Figure 18:
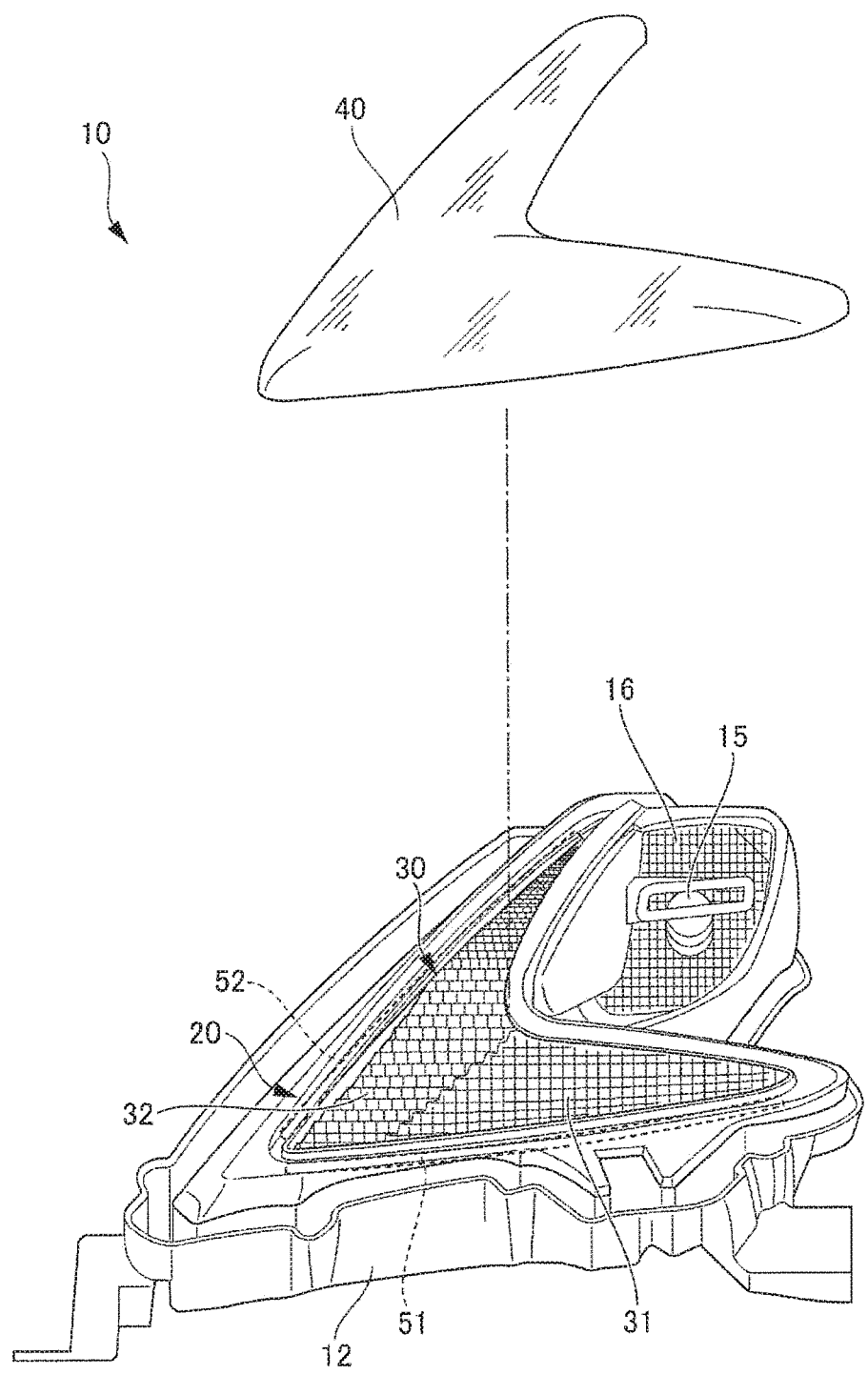
FIG. 18 is an exploded view in a case where an inner lens has been further removed from the vehicular lamp fitting of FIG. 17.

FIG. 18 is a view showing a state in which the inner lens 40 of the vehicular lamp fitting 10 has been removed. It is to be noted that the outer lens 13 is not shown. As shown in FIG. 18, the reflector 30 is mounted to the inner panel 20 that is disposed in the housing 12, and the inner lens 40 is mounted to the inner panel 20 so as to cover a front face of the inner panel 20.

The reflector 30 is made of two faces which are a reflector 31 and a reflector 32 which have been formed to be integral with each other; a light guide member 51 is disposed so as to oppose to the reflector 31, and a light guide member 52 is disposed so as to oppose to the reflector 32. In addition, the light from the light guide member 51 is reflected by the reflector 31; the light from the light guide member 52 is reflected by the reflector 32; due to these reflected light beams, the inner lens 40 emits light uniformly; and for example, a clearance lamp (a vehicle width lamp) or a daytime light (daytime lamp) is configured.

Although in the third embodiment, there is shown a case in which the reflector 30 is obtained as a reflector 30 formed in a substantial V-shape made of two faces which are the reflector 31 and the reflector 32 that have been formed to be integral with each other, and the inner lens 40 is also formed in a substantial V-shape, the reflector 30 and the inner lens 40 are not limitative to such shape and configuration.

For example, there may be a configuration made of the reflector 31 and the light guide member 51 while the reflector 32 and the light guide member 52 are omitted in accordance with the required shape of the vehicular lamp fitting 10, and the reflector 31 is also limitative to a substantially triangular face as shown in FIG. 18. Namely, there may be a configuration in which only a reflector 31 with its substantially uniform width is provided along the light guide member 51 without the reflector 32 and the light guide member 52, and in this case, it may also be that the inner lens 40 has a substantially uniform width and is formed in such a shape as to cover the reflector 31.

Hereinafter, with reference to FIG. 19, the vehicular lamp fitting 10 of the third embodiment will be described in detail. As described above, the reflector 32 and the light guide member 52 are not mandatory; and therefore, portions of the reflector 31 and the light guide member 51 will be mainly described hereinafter.

Figure 16:
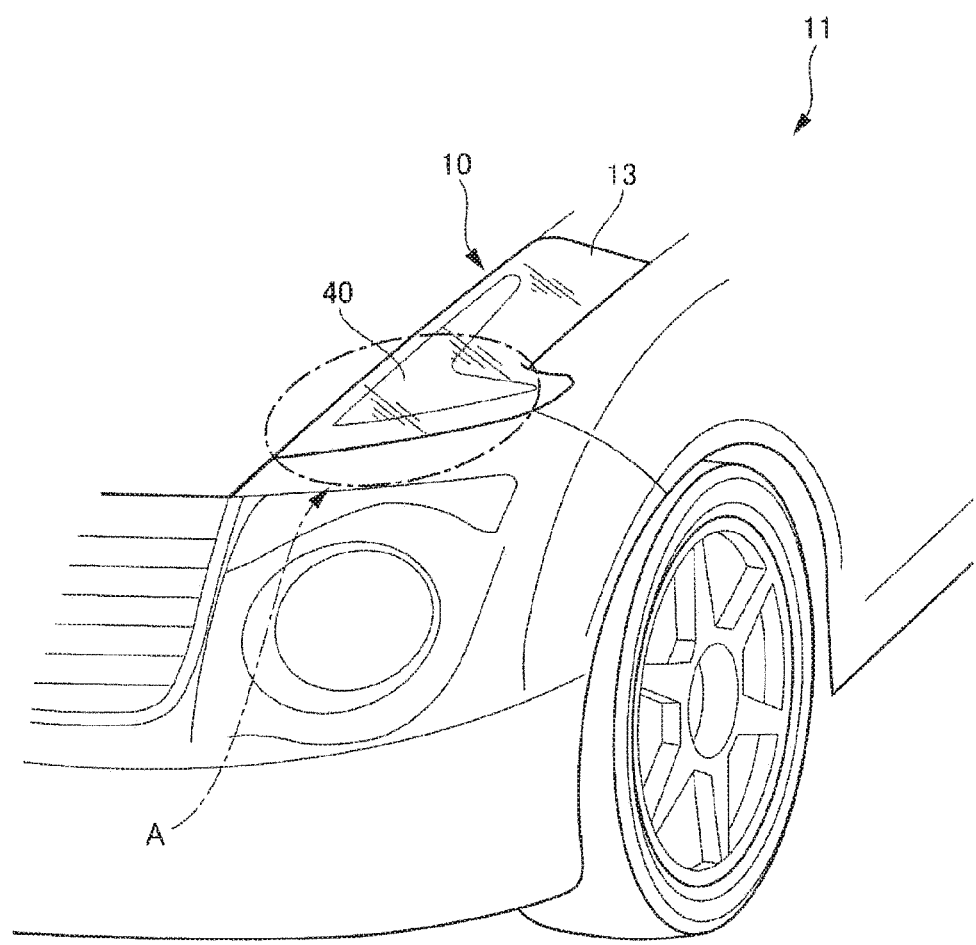
FIG. 16 is a perspective view of a vehicular front part which is equipped with a vehicular lamp fitting of a third embodiment according to the present invention.

FIG. 19 is a perspective view showing the portion A of FIG. 16 of the vehicular lamp fitting 10 in an enlarged manner, and the outer lens 13 and the inner lens 40 are not shown. As shown in FIG. 19, at a portion of the reflector 31 at the vehicular central side, an opening 33 is formed, and an end part of the light guide member 51, through the opening 33, is led out to the back face side of the reflector 31.

At the back face side of the reflector 31, a light source to make light incident to the end part of the light guide member 51 that has been led out is disposed. More specifically, a self-emission semiconductor-type light source such as an LED or an EL (an organic EL) on which a light emitting chip has been implemented on a board thereof is provided at the back face side of the reflector 31, and a light emission surface of the light emitting chip is disposed so as to oppose to the end part of the light guide member 51.

The reflector 31 is characterized in that a first reflection portion 34 is provided in contact with the opening 33 that has been provided at the vehicular central side, and further, has a second reflection portion 35 connecting to the first reflection portion 34, that has been provided at a side spaced from the self-emission semiconductor-type light source of the first reflection portion 34. Namely, the first reflection portion 34 is provided at the self-emission semiconductor-type light source side of the reflector 31 more significantly than the second reflection portion 35.

At the light guide member 51, a prism structure (not shown) to emit the light that is guided in the light guide member 51, to the reflector 31 side is formed in a longitudinal direction, and the light that has been reflected so as to exceed a critical angle with this prism structure is sequentially emitted to the reflector 31 side and then the emitted light is reflected by the first reflection portion 34 and the second reflection portion 35 of the reflector 31.

As shown in FIG. 19, in the third embodiment, the first reflection portion 34 is formed by providing a three-stepped reflection surface 34a along the light guide member 51 from a position which comes into contact with the opening 33. Incidentally, although a reason why it is preferable to provide the first reflection portion 34 in contact with the opening 33 will be described later, it is not always meant to be limitative to the fact that the first reflection portion is formed so as to come into contact with the opening 33 as in the embodiment.

In addition, although in the third embodiment, the reflection surface 34a coming into contact with the opening 33, as seen in the vertical direction of FIG. 19, is formed of one reflection surface, a further reflection surface 34a is formed so as to have two reflection surfaces in the vertical direction, and a furthermore reflection surface 34a is formed so as to have three reflection surfaces in the vertical direction.

Incidentally, it may be appropriately determined how many reflection surfaces each reflection surface 34a is composed of, in a vertical direction, so that a predetermined light distribution state is obtained in view of a width or the like of a width in the vertical direction of the first reflection portion 34. In addition, although in the embodiment, a three-stepped reflection surface 34 is provided along the light guide member 51 from the position which comes into contact with the opening 33, it may be appropriately determined how many stepped reflection surface 34a is formed in view of the fact that a predetermined light distribution state is obtained.

Each of the reflection surfaces 34a of the first reflection portion 34 is formed so as to reflect the light from the light guide member 51 to the vehicular inside. In more detail, each of the reflection surfaces 34a is formed so as to reflect the light from the light guide member 51 to the lower side of the vehicular inside. Namely, the first reflection portion 34 is a reflection portion which is formed to reflect the light from the light guide member 51 to the lower side of the vehicular inside. On the other hand, each of the reflection surfaces 35a of the second reflection portion 35 is formed so as to reflect the light from the light guide member 51 to the vehicular front side. Namely, the second reflection portion 35 is a reflection portion which is formed so as to reflect the light from the light guide member 51 to the vehicular front side.

Functions and advantageous effects of the third embodiment will be described. In the third embodiment, a self-emission semiconductor-type light source is disposed at a back face side of a reflector 31 at a vehicular central side. For example, it is also possible to provide a self-emission semiconductor-type light source which makes light incident to an end part of a light guide member 51 at an opposite side to that of the third embodiment, namely, an end part of each outside of the light guide member 51 (at an vehicular rear side). However, the end part side of the vehicular outside (the vehicular rear side) is easily visually recognized when the light source is seen from a vehicular front side, and if the self-emission semiconductor-type light source is disposed at such a position, constituent elements of the self-emission semiconductor-type light source can be visually recognized, and the appearance is impaired.

Assuming that an opening is provided in the reflector 31 as in the third embodiment so as to dispose the end part of the vehicular outside (the vehicular rear side) of the light guide member 51 at the back face side of the reflector 31 and then dispose the self-emission semiconductor-type light source at the back face side of the reflector 31, whereby the constituent elements of the self-emission semiconductor-type light source per se is hardly visually recognized from the vehicular front side, the opening that has been formed in the reflector 31 is positioned at a position which can be easily visually recognized from the vehicular front side. Thus, although there is a need to provide a cover for making the opening or the like hardly visible, a portion which has been covered with the cover becomes dark, and the appearance is impaired.

From this point view, if the self-emission semiconductor-type light source is disposed at the vehicular central side, even if the light source is configured to be disposed at the rear face side of the reflector 31, it is possible to dispose the light source so as to be hidden at a corner of the inner panel 20 and thus the appearance can be improved. In addition, as in the third embodiment, in the case where the self-emission semiconductor-type light source is disposed at the back face side of the reflector 31, the opening 33 for drawing the end part of the light guide member 51 to the back face side of the reflector 31 is provided; and however, the opening 33 can be positioned at a position which is hardly visually recognized from the vehicular front side; and therefore, the appearance can be improved. Further, the vehicular lamp fitting 10 slants from the vehicular front side to the vehicular rear side, it is possible to orient the direction of the opening 33 to the vehicular rear side and thus it is also possible to form the opening 33 per se so as to be hardly visually recognized from the vehicular front side; and therefore, the appearance can be more remarkably improved.

On the other hand, if an attempt is made to provide the self-emission semiconductor-type light source at the vehicular central side, the light to be guided in the light guide member 51 that is disposed in accordance with slanting of the vehicular lamp fitting 10 is guided from the vehicular front side to the vehicular rear side. Here, although much of the light that is guided in the light guide member 51 is emitted to the reflector 31 side by means of a prism structure, partial light is also emitted in a direction which is different from the reflector 31 side. However, the partial light that is emitted in the direction that is different from the reflector 31 side is emitted to a light guiding direction and thus is not obtained as the light that is emitted to the vehicular inside (a lower side of the vehicular inside).

Therefore, if the reflector 31 is composed of only the second reflection portion 35 that reflects light to the vehicular front side, the light that is appropriately radiated to the vehicular inside (the lower side of the vehicular inside) is not obtained; and however, as in the embodiment, the first reflection portion 34 to reflect light to the vehicular inside (the lower side of the vehicular inside) is provided at the reflector 31, thereby making it possible to obtain the light that is appropriately radiated to the vehicular inside (the lower side of the vehicular inside).

As has been described above, the first reflection portion 34 reflects the light from the light guide member 51 so as to radiate the light to the vehicular inside (the lower side of the vehicular inside), and the second reflection portion 35 reflects the light so as to radiate the light to the vehicular front side. Thus, for example, if an attempt is made to form the first reflection portion 34 at a part inside of the second reflection portion 35, a portion of the inner lens 40 irradiated with the light that has been reflected by the first reflection portion 34 is produced in the portion of the inner lens 40 irradiated with the light that has been reflected by the second reflection portion 35 when the light source is seen from the vehicular front side. As described above, the first reflection portion 34 and the second reflection portion 35 are characterized in that a light emission state of the inner lens 40 irradiated with the light that has been reflected by the first reflection portion 34 is different from a light emission state of the inner lens 40 irradiated with the light that has been reflected by the second reflection portion 35. More specifically, the second reflection portion 35 reflects the light to the vehicular front side, whereas the first reflection portion 34 does not reflect the light to the vehicular front side; and therefore, there may be a case in which a portion of the inner lens 40 irradiated with the light that has been reflected by the first reflection portion 34 becomes slightly dark, and the appearance is impaired when the light source is seen from the vehicular front side.

Therefore, in the third embodiment, the first reflection portion 34 is formed in contact with the opening 33. A portion coming into contact with the opening 33 is a position on a surface side of the reflector 31 which is the closest to the self-emission semiconductor-type light source; the light that is guided in the light guide member 51 corresponding to this portion is hardly attenuated and thus the quantity of the light is large; and the light guide member 51 per se is blight and thus the visual darkness of the inner lens 40 under the influence of the first reflection portion 34 as described above is mitigated and then impairment of the appearance is alleviated.

As described above, although it is the most preferable that the first reflection portion 34 be formed so as to come into contact with the opening 33, as long as the reflection portion is formed in the opening 33, namely, in a location which is close to the self-emission semiconductor-type light source, a similar advantageous effect is attained even if the reflection portion does not come into contact with the opening 33. Therefore, it is preferable that the first reflection portion 34 be formed at the self-emission semiconductor-type light source side of the reflector 31.

Further, in the third embodiment, the first reflection portion 34 is positioned in a location which is close to an end at the vehicular central side of the reflector 31, namely, is provided at a position which corresponds to an end side at the vehicular central side of the inner lens 40. For example, in a case where there is a portion of which light emission state is different from another at a center or the like of the inner lens 40, the portion of which light emission state is different therefrom becomes conspicuous; and however, the difference in light emission state is not so conspicuous at the end side, thus making it possible to avoid impairment of the appearance. As described above, the first reflection portion 34 of the embodiment is provided at the position that corresponds to the end side of the inner lens 40 of which difference in light emission state is inconspicuous, thus making it possible to avoid the impairment of the appearance.

In addition, in a case where the vehicular lamp fitting 10 slants from the vehicular front side to the vehicular rear side, if the first reflection portion 34 is formed at a portion of the reflector 31 at the vehicular rear side, there may be a case in which the light that is reflected by the first reflection 34 and then travels to the vehicular inside (the lower side of the vehicular inside) is blocked by the inner panel or the like at the vehicular inside. In the embodiment, the first reflection portion 34 is formed at the vehicular central side of the reflector 31 that is to be positioned at the vehicular front side, thus making it possible to avoid the light being blocked by the inner panel or the like of the vehicular inside, the light being reflected by the first reflection portion 34 and then travels to the vehicular inside (the lower side of the vehicular inside).

In the meanwhile, the embodiment was described with respect to the case in which the prism structure to be provided at the light guide member 51 is the prism structure to reflect the light that is guided in the light guide member 51, to the reflector 31 side. However, in a vehicular lamp fitting which employs a light guide member, there may be a case in which a prism structure is provided at the back face side of the light guide member (the vehicular side) so that the light that is guided in the light guide member is emitted to the vehicular front side. In this case as well, all of the light that is guided in the light guide member is not emitted to the vehicular front side by the prism structure, and a part of the light that is guided in the light guide member is emitted to the vehicular side; and therefore, there are many cases in which a reflector for reflecting the light that has been emitted to the vehicular side is provided at the back face side of the light guide member (the vehicular side).

The light that is emitted from the light guide member is not larger in angle of emission than that of another light source such as a halogen lamp, if the light guide member is disposed to slant from the vehicular front side to the vehicular rear side in accordance with slanting of the vehicular lamp fitting, even if the prism structure is formed so as to radiate light to the vehicular front side, it is difficult to appropriately radiate the light from the light guide member to the vehicular inside (the lower side of the vehicular inside).

In such a case as well, the reflection portion (the first reflection portion) to reflect the light from the light guide member to the vehicular inside (the lower side of the vehicular inside) is provided at a part of the reflector that is disposed at the back face side of the light guide member, thereby making it possible to provide a vehicular lamp fitting which is capable of appropriately radiating light to the vehicular inside (the lower side of the vehicular inside).

In addition, in such a case as well, it is appropriate that the self-emission semiconductor-type light source is disposed at the vehicular central side in terms of the appearance that has been described hereinabove, and it is also preferable that the reflection portion (the first reflection portion) to reflect the light from the light guide member that is provided at a part of the reflector be also provided at the vehicular central side of the reflector so as to be provided at a position which is close to the self-emission semiconductor-type light source.

Although the quantity of the light that is guided in the light guide member attenuates far away from the self-emission semiconductor-type light source, the light does not attenuate so much at a portion which is close to the self-emission semiconductor-type light source of the light guide member; and therefore, the quantity of the light that is emitted to the reflector side is also large in comparison with that at any other portion.

Thus, the first reflection portion is provided in a location which is close to the self-emission semiconductor-type light source, whereby a large amount of light can be radiated to the vehicular inside (the lower side of the vehicular inside) in comparison with the case in which the first reflection portion is provided at a position which is distant from the semiconductor-type light source, and the visibility of the vehicular inside (the lower side of the vehicular inside) can be improved.

Although the present invention has been described hereinabove by way of the embodiments, it is a matter of course that the technical scope of the present invention is not limitative to the scope set forth in the embodiments. It is self-evident to one skilled in the art to be possible to make a variety of alterations or modifications for the embodiments. In addition, it is self-evident from the claims that a mode in which such alterations or modifications have been made can also be encompassed in the technical scope of the present invention.

The invention claimed is:

1. A vehicular lamp fitting which is disposed at a vehicular front side of a vehicle, the vehicle having a longitudinal axis from a vehicular back side to the vehicular front side, the vehicular lamp fitting comprising:
   a light source;
   a reflector having a first reflector portion;
   an inner panel with which the reflector is engaged; and
   a first light guide member which is disposed upward of an outer circumference of the first reflector portion closer to the longitudinal axis than the first reflector portion and faces the first reflector portion;
   wherein the light source being provided at at least one of a first end part or a second end part of the first light guide member, and makes light incident into the first light guide member,
   the first light guide member emits light to a vehicular lateral side, the first reflector portion reflects light emitted from the first guide member, and the first light guide member has a reflection surface arranged to reflect the light incident from the light source to emit toward the first reflector portion so that a part of the light that is emitted toward the first reflector portion travels to the vehicular lateral outward side without being reflected by the first reflector portion, in which the reflector has a second reflector portion which is provided so as to come into contact with the first reflector portion, a second light guide member which is provided along an end part of the second reflector portion and faces the second reflector portion; and a light source which is disposed at least one of a first end part and a second end part of the second light guide member, and makes light incident into the second light guide member, wherein the second light guide member has a reflection surface to reflect the light that is guided in the second light guide member, toward the second reflector portion, wherein, a boundary portion at which the first reflector portion and the second reflector portion come into contact with each other is provided with a plurality of cutouts, the second reflector portion extending substantially perpendicular to the first reflector portion.

2. The vehicular lamp fitting according to claim 1, wherein the second reflector portion has a side hole for routing the first end part of the second light guide member to a back face side of the second reflector portion, the first end part of the second light guide member is disposed at the back face side of the second reflector portion through the side hole thereof, and the light source is disposed at the back face side of the second reflector portion so as to make light incident to the first end part.

3. The vehicular lamp fitting according to claim 1, wherein the first end part of the second light guide member is at the vehicular front side of the second light guide member.

4. The vehicular lamp fitting according to claim 1, wherein the inner panel has an edge part so that the second light guide member is covered by the edge part so that light is not substantially emitted toward the vehicular front side.

5. The vehicular lamp fitting according to claim 1, wherein the first reflector portion has a side hole for routing the first end part of the first light guide member to a back face side of the first reflector portion, the first end part of the first light guide member is disposed at the back face side of the first reflector portion through the side hole thereof, and the light source is disposed at the back face side of the first reflector part so as to make light incident to the first end part of the first light guide member.

6. The vehicular lamp fitting according to claim 1, wherein the first reflector portion has another side hole for routing the second end part of the first light guide member to the back face side of the first reflector portion, the second end part of the first light guide member is disposed at the back face side of the first reflector portion through the another side hole thereof, and the light source is disposed at the back face side of the first reflector portion so as to make light incident to the second end part of the first light guide member.

7. The vehicular lamp fitting according to claim 1, wherein the first end part of the first light guide member is at the vehicular front side of the first light guide member, and the second end part of the first light guide member is at a vehicular rear side of the first light guide member.

8. The vehicular lamp fitting according to claim 1, wherein the inner panel has an edge part so that the first light guide member is covered by the edge part so that light is not substantially emitted toward the vehicular front side.

* * * * *